(12) United States Patent
Kitaura et al.

(10) Patent No.: US 10,830,167 B2
(45) Date of Patent: Nov. 10, 2020

(54) EXHAUST GAS PURIFICATION SYSTEM FOR AN INTERNAL COMBUSTION ENGINE

(71) Applicant: Toyota Jidosha Kabushiki Kaisha, Toyota (JP)

(72) Inventors: Koichi Kitaura, Odawara (JP); Yasuyuki Irisawa, Susono (JP); Hirofumi Kubota, Mishima (JP); Takashi Tsunooka, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 271 days.

(21) Appl. No.: 15/982,327

(22) Filed: May 17, 2018

(65) Prior Publication Data

US 2018/0334978 A1 Nov. 22, 2018

(30) Foreign Application Priority Data

May 19, 2017 (JP) .................. 2017-099759

(51) Int. Cl.
*F02D 41/02* (2006.01)
*F02B 37/18* (2006.01)
(Continued)

(52) U.S. Cl.
CPC ....... *F02D 41/0235* (2013.01); *F01N 3/2006* (2013.01); *F01N 3/2892* (2013.01); *F01N 5/04* (2013.01); *F01N 9/00* (2013.01); *F01N 13/08* (2013.01); *F02B 37/18* (2013.01); *F02D 41/0002* (2013.01); *F02D 41/0007* (2013.01); *F02D 41/123* (2013.01); *F01N 3/101* (2013.01); *F01N 2240/36* (2013.01); *F01N 2260/08* (2013.01); *F01N 2340/06* (2013.01); *F01N 2410/02* (2013.01); *F01N 2410/03* (2013.01);
(Continued)

(58) Field of Classification Search
CPC .... F02D 41/123; F01N 3/2882; F01N 3/2892; F02B 37/18
See application file for complete search history.

(56) References Cited

U.S. PATENT DOCUMENTS

2012/0137677 A1 6/2012 Sato
2012/0240571 A1* 9/2012 Otsuka .................. F02D 17/02
60/601

FOREIGN PATENT DOCUMENTS

| JP | 2011-027058 A | 2/2011 |
| JP | 5246350 B2 | 7/2013 |
| WO | 2012/042609 A1 | 4/2012 |

* cited by examiner

*Primary Examiner* — Ngoc T Nguyen
(74) *Attorney, Agent, or Firm* — Dinsmore & Shohl LLP

(57) ABSTRACT

The deterioration of an exhaust gas purification catalyst is suppressed as much as possible. An exhaust gas purification system for an internal combustion engine comprising: a throttle valve; a turbocharger; an exhaust gas purification catalyst; a bypass passage; a turbo bypass valve (TBV); and a controller. The controller is configured to carry out fuel cut processing and deterioration suppression control. In the deterioration suppression control, when a temperature of the exhaust gas purification catalyst is equal to or higher than a predetermined temperature in the course of the execution of the fuel cut processing, the degree of opening of the TBV becomes smaller, and the degree of opening of the throttle valve becomes larger, than when the temperature of the exhaust gas purification catalyst is lower than the predetermined temperature in the course of the execution of the fuel cut processing.

8 Claims, 12 Drawing Sheets

(51) Int. Cl.
    *F01N 9/00*         (2006.01)
    *F02D 41/00*      (2006.01)
    *F01N 5/04*         (2006.01)
    *F02D 41/12*      (2006.01)
    *F01N 3/20*         (2006.01)
    *F01N 13/08*      (2010.01)
    *F01N 3/28*         (2006.01)
    *F01N 3/10*         (2006.01)

(52) U.S. Cl.
    CPC ...... *F01N 2430/00* (2013.01); *F01N 2560/06* (2013.01); *F01N 2900/08* (2013.01); *F01N 2900/1602* (2013.01); *F01N 2900/1631* (2013.01); *F02D 2041/0265* (2013.01); *F02D 2200/0802* (2013.01); *F02D 2250/34* (2013.01)

[FIG. 1]
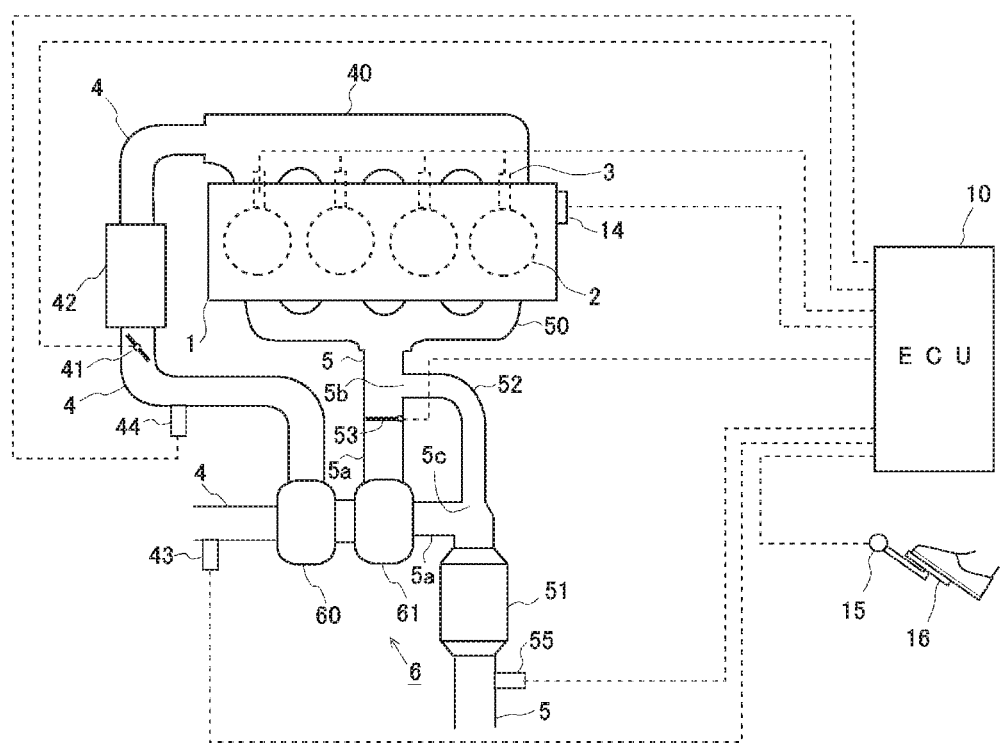

[FIG. 2]
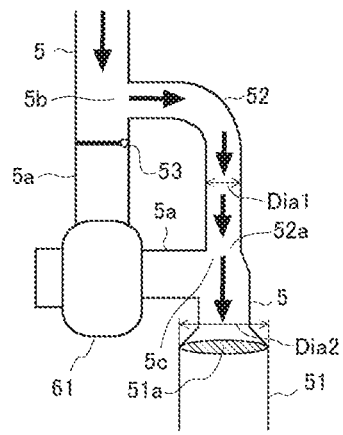
[FIG. 3]
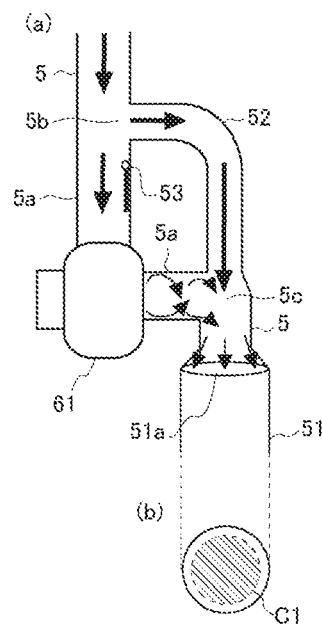

[FIG. 4]
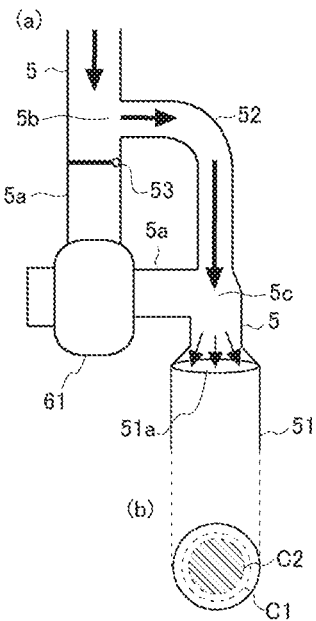
[FIG. 5A]
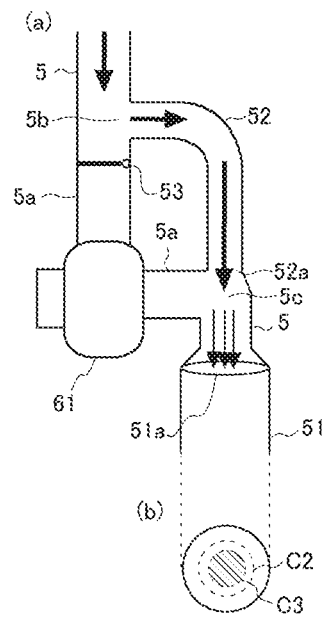

[FIG. 5B]
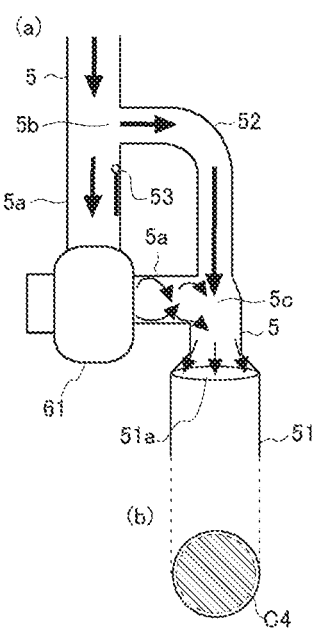

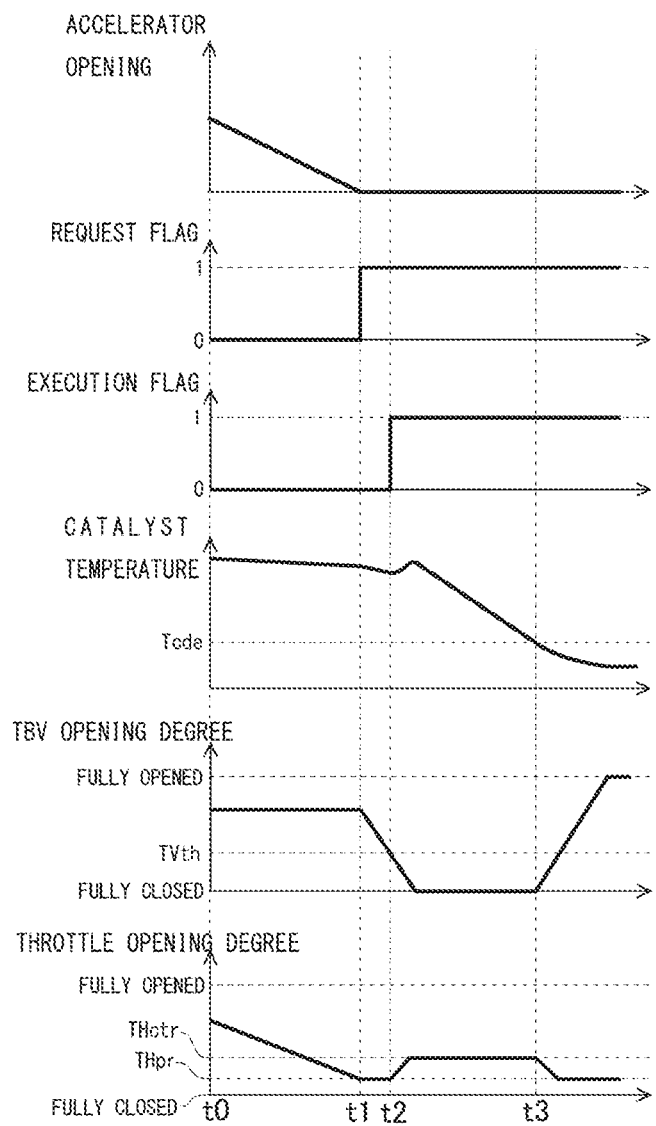
[FIG. 6]

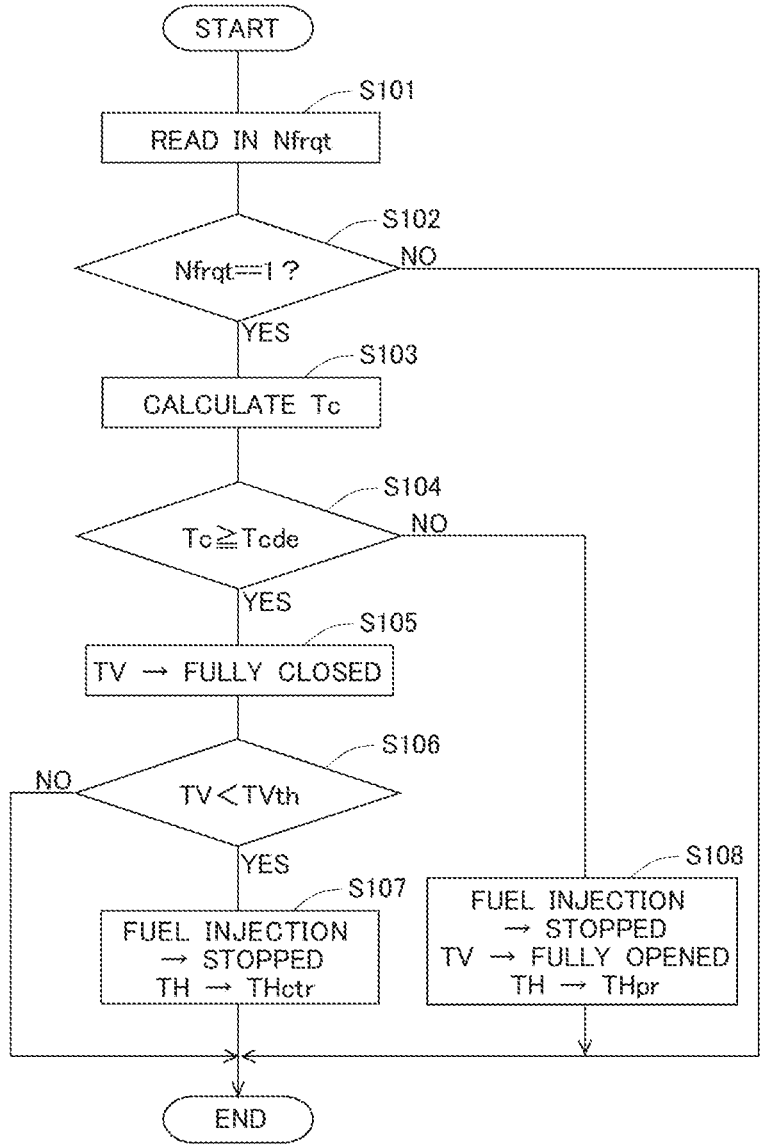
[FIG. 7]

[FIG. 8]
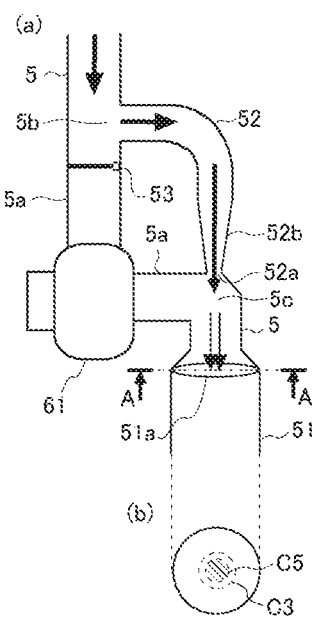

[FIG. 9]
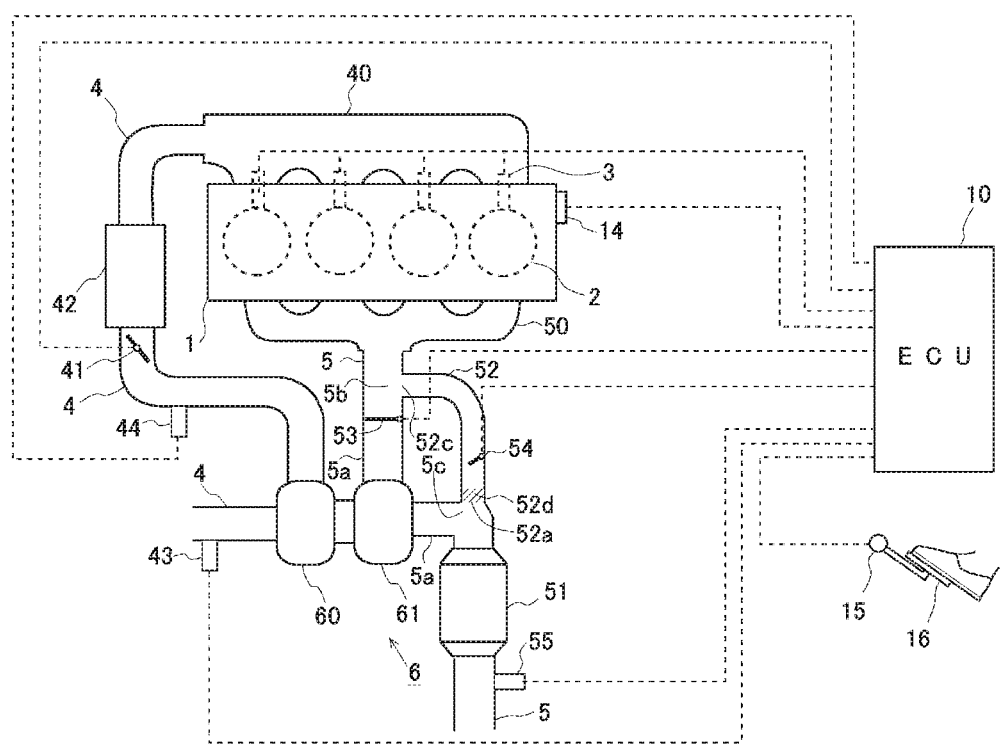

[FIG. 10]
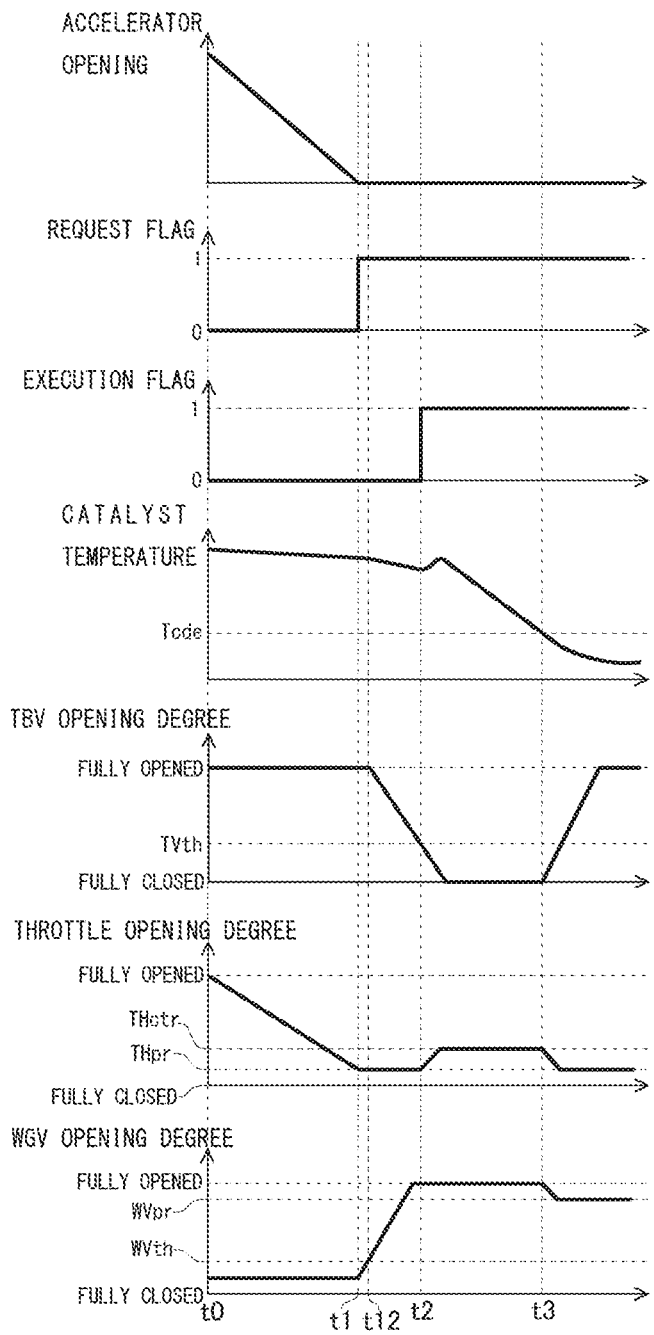

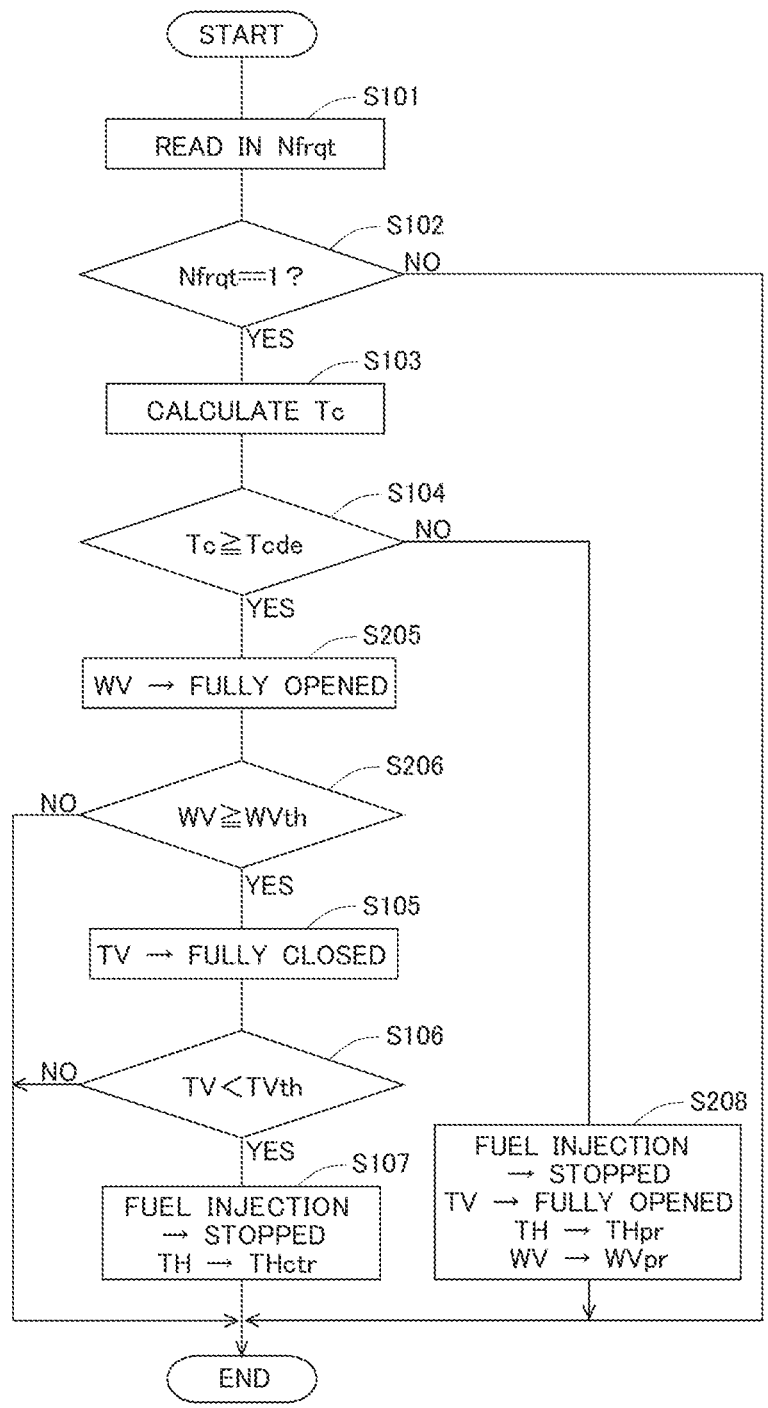
[FIG. 11]

[FIG. 12]
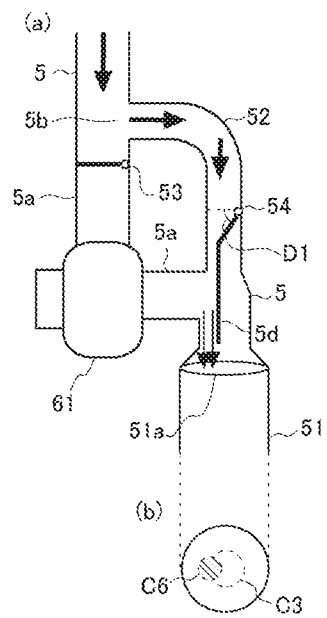
[FIG. 13]
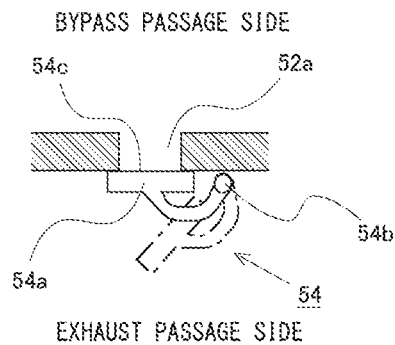

[FIG. 14A]
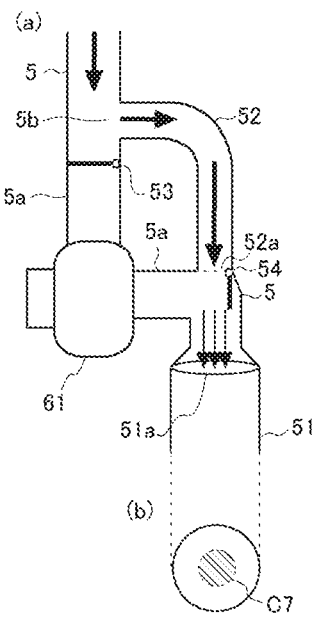
[FIG. 14B]
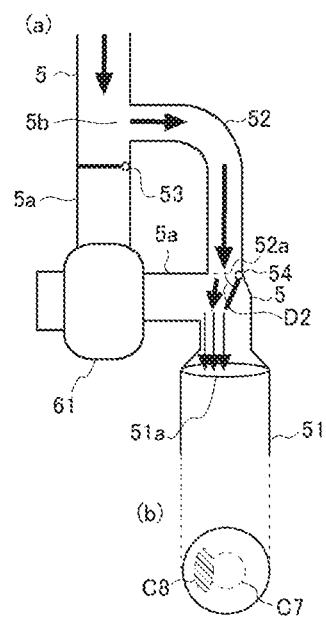

EXHAUST GAS PURIFICATION SYSTEM FOR AN INTERNAL COMBUSTION ENGINE

CROSS-REFERENCE TO RELATED APPLICATIONS

This application claims priority to Japanese Patent Application No. 2017-099759 filed on May 13, 2017, the entire contents of which are incorporated by reference.

BACKGROUND

Technical Field

The present disclosure relates to an exhaust gas purification system for an internal combustion engine provided with a turbocharger.

Description of the Related Art

In a construction in which a turbine of a turbocharger is arranged in an exhaust passage of an internal combustion engine, there may be formed, a bypass passage bypassing the turbine. In this case, an exhaust gas purification catalyst is arranged, for example, in the exhaust passage at the downstream side of a merge portion between the exhaust passage and the bypass passage.

Then, in patent literature 1, there is disclosed a technology in which a wastegate valve (hereinafter, sometimes referred to as a "WGV") is arranged in a bypass passage. With this technology, the degree of opening of the WGV is controlled during the execution of fuel cut processing in an internal combustion engine. Specifically, in the course of the execution of the fuel cut processing, and when the temperature of an exhaust gas purification catalyst is higher than a predetermined temperature, the degree of opening of the WGV is made larger than that at a start point in time of the fuel cut processing.

In addition, in patent literature 2, there is disclosed a construction which is provided with a WGV and an exhaust gas shutoff valve that is arranged in an exhaust passage at the downstream side of a turbine and at the upstream side of a merge portion between the exhaust passage and a bypass passage.

CITATION LIST

Patent Literature

Patent Literature 1: International Laid-Open Publication No. 2012/042609
Patent Literature 2: Japanese Patent Application Laid-open. No. 2011-027058

SUMMARY

An exhaust gas purification catalyst tends to be easily deteriorated, when the temperature thereof is relatively high and when oxygen is supplied to the exhaust gas purification catalyst. Accordingly, in the course of the execution of fuel cut processing in an internal combustion engine, and when the temperature of the exhaust gas purification catalyst is relatively high, the exhaust gas purification catalyst tends to be easily deteriorated. It addition, in a construction in which a turbine is arranged in an exhaust passage at the ups crease side of an exhaust gas purification catalyst, when an exhaust gas passes through the turbine, it will tend to easily diffuse before the exhaust gas flows into the exhaust gas purification catalyst. Then, if the exhaust gas diffused in this manner flows into the exhaust gas purification catalyst, the exhaust gas will flow through a relatively wide range of an exhaust gas flow passage or channel in the exhaust gas purification catalyst. In view of the above, there is a fear that in the construction in which the turbine is arranged in the exhaust passage at the upstream side of the exhaust gas purification catalyst, when fuel out processing is carried out if the temperature of the exhaust gas purification catalyst is relatively high, the exhaust gas purification catalyst may deteriorate in a relatively wide range thereof in which the exhaust gas diffused by the turbine (in this case, the exhaust gas being the air discharged from the internal combustion engine) flows.

Here, in the past, it has been considered that in the course of the execution of fuel cut processing, and if the temperature of the exhaust gas purification catalyst is higher than the predetermined temperature, the degree of opening of the WGV is made larger, thereby suppressing the exhaust gas (air) diffused by the turbine from flowing into the exhaust gas purification catalyst. However, according to this conventional technology, the degree of opening of a throttle valve at this time remains an ordinary degree of opening during the execution of the fuel cut processing. For that reason, the flow speed of the exhaust gas (air) flowing through the bypass passage tends to become slow, so that it becomes easy for the exhaust gas (air) flowing out from the bypass passage to a diffuse. As a result, the exhaust gas purification catalyst may deteriorate in a relatively wide range thereof in which the diffused exhaust gas flows. Then, with respect to the technology of suppressing the deterioration of the exhaust gas purification catalyst in its relatively wide range in an appropriate manner, there is still room left for improvement.

The present disclosure has been made in view of the problems as referred to above, and has for its object to suppress deterioration of an exhaust gas purification catalyst arranged in an exhaust passage of an internal combustion engine as much as possible.

Solution to Problem

In the present disclosure, when the temperature of an exhaust gas purification catalyst is equal to or higher than a predetermined temperature in the course of the execution of fuel cut processing in an internal combustion engine, the degree of opening of a turbo bypass valve and the degree of opening of a throttle valve are controlled so as to be different from those when the temperature of the exhaust gas purification catalyst is lower than the predetermined temperature in the course of the execution of the fuel cut processing.

More specifically, an exhaust gas purification system fox an internal combustion engine according to the present disclosure comprises: a throttle valve that is arranged in an intake passage of said internal combustion engine; a turbocharger with a turbine that is arranged in an exhaust passage of said internal combustion engine; an exhaust gas purification catalyst that is arranged in said exhaust passage at the downstream side of said turbine, said exhaust gas purification catalyst having an ability to store oxygen in an exhaust gas; a bypass passage that branches from said exhaust passage at a location upstream of said turbine, and merges to said exhaust passage at a location upstream of said exhaust gas purification catalyst, while bypassing said turbine, wherein said bypass passage is constructed to have an outlet of which diameter is smaller than a diameter of an upstream side end face of said exhaust gas purification catalyst, and is also constructed so as to direct a direction of flow of a bypass exhaust gas, which is the exhaust gas flowing out from said bypass passage into said exhaust passage, toward the upstream side end face of said exhaust gas purification catalyst; a turbo bypass valve that is arranged in said exhaust passage between a branch portion of said bypass passage and a merge portion of said bypass passage, said turbo bypass valve being able to adjust a flow rate of the exhaust gas passing through said turbine; and a controller comprising at least one processor configured to: carry out fuel cut processing which stops the supply of fuel into a cylinder of said internal combustion engine during operation of said internal combustion engine; and carry out deterioration suppression control which controls a degree of opening of said turbo bypass valve and a degree of opening of said throttle valve in such a manner that when a temperature of said exhaust gas purification catalyst is equal to or higher than a predetermined temperature in the course of the execution of said fuel cut processing, the degree of opening of said turbo bypass valve becomes smaller; and the degree of opening of said throttle valve becomes larger, than when the temperature of said exhaust gas purification catalyst is lower than said predetermined temperature in the course of the execution of said fuel cut processing.

Here, said predetermined temperature is defined, as a lower limit value of a temperature range in which when oxygen is supplied to the exhaust gas purification catalyst, the exhaust gas purification catalyst will become easy to be deteriorated. Accordingly, when the temperature of said exhaust gas purification catalyst is equal to or higher than the predetermined temperature in the course of the execution of the fuel cut processing by the controller (hereinafter, sometimes referred to as "during the execution of fuel cut in a catalyst's high temperature state"), the exhaust gas purification catalyst becomes easy to be deteriorated. On the other hand, when the temperature of said exhaust gas purification catalyst is lower than the predetermined temperature in the course of the execution of said fuel cut processing by the controller (hereinafter, sometimes referred to as "during the execution of fuel cut in a catalyst's normal state"), the exhaust gas purification catalyst becomes hard to be deteriorated in comparison with during the execution of fuel cut in the catalyst's high temperature state.

In addition, during the execution of fuel cut in the catalyst's normal state, the degree of opening of the turbo bypass valve (hereinafter, sometimes referred to as the "TBV opening degree") and the degree of opening of the throttle valve (hereinafter, sometimes referred to as the "throttle opening degree") are controlled to a TBV opening degree and a throttle opening degree based on normal control accompanying the execution of fuel cut processing.

In contrast to this, during the execution of fuel cut in the catalyst's high temperature state, i.e., in a state where the exhaust gas purification catalyst is apt to be deteriorated, an exhaust gas (in this case, the exhaust gas being air discharged from the internal combustion engine) may diffuse before flowing into the exhaust gas purification catalyst, and when the exhaust gas (air) thus diffused flows through a relatively wide range of an exhaust gas flow passage or channel in the exhaust gas purification catalyst, the catalyst may be deteriorated in a relatively wide range thereof, accordingly, said controller controls the TBV opening degree and the throttle opening degree in such a manner that the TBV opening degree becomes smaller, and the throttle opening degree becomes larger, during the execution of fuel cut in the catalyst's high temperature state, than during the execution of fuel cut in the catalyst's normal state. Hereinafter, such control is referred to as "deterioration suppression control".

Here, if the throttle opening degree is the same, the flow rate of the exhaust gas passing through the turbine decreases more when the TBV opening degree is small than when it is large. As a result, the inflow rate of the exhaust gas diffused by the turbine flowing into the exhaust gas purification catalyst will decrease. This serves to suppress the diffusion of the exhaust gas before flowing into the exhaust gas purification catalyst. Here, note that, at this time, when the TBV is controlled to its fully closed state, the diffusion of the exhaust gas before flowing into the exhaust gas purification catalyst is suppressed as ranch as possible.

Moreover, the flow rate of the exhaust gas discharged from the internal combustion engine increases more when the throttle opening degree is large than when it is small. Then, when the flow rate of the exhaust gas increases in this manner, the flow speed of the exhaust gas flowing through the bypass passage will become fast, if the TBV opening degree is the same. Here, the bypass exhaust gas flowing out from the bypass passage becomes harder to diffuse when the flow speed of the exhaust gas flowing through the bypass passage is fast than when it is slow.

Here, the bypass passage is constructed in such a manner that the diameter of its outlet is smaller than the diameter of the upstream side end face of the exhaust gas purification catalyst (hereinafter, sometimes referred to simply as the "upstream side end face"), and that the bypass exhaust gas is directed to the upstream side end face. For that reason, the bypass exhaust gas becomes easy to flow into the exhaust gas purification catalyst, without colliding with a wall surface of the exhaust passage. Then, when the control carries out the deterioration suppression control, the ratio of the bypass exhaust gas (air) with relatively fast flow speed will become high in the exhaust gas flowing into the exhaust gas purification catalyst (air). In view of the above, during the execution of fuel cut in the catalyst's high temperature state in which the deterioration suppression control by the controller is carried out, the diffusion of the exhaust gas (air) before flowing into the exhaust gas purification catalyst is more suppressed, thus making it easy for the exhaust gas (air) to flow into a narrow range in the upstream side end face, in comparison with during the execution of fuel cut in the catalyst's normal state.

As a result, the exhaust gas (air) during the execution of fuel cut in the catalyst's high temperature state will flow through a narrow range of the exhaust gas flow passage or channel in the exhaust gas purification catalyst. With this, the exhaust gas purification catalyst is suppressed from being deteriorated in the relatively wide range thereof during the execution of fuel cut in the catalyst's high temperature state. In other words, the exhaust gas purification system for an internal combustion engine according to the present disclosure makes it possible to suppress the deterioration of the exhaust gas purification catalyst as much as possible.

In addition, the exhaust gas purification system for an internal combustion engine according to the present disclosure may be further comprised a wastegate valve that is arranged in said bypass passage at a location upstream of a predetermined downstream side portion thereof including its outlet, and that is able to change an exhaust gas channel cross sectional area in said bypass passage. Then, said controller may be further configured to control a degree of opening of said wastegate valve in such a manner that the degree of opening of said wastegate valve becomes a degree of opening in its fully opened state, when the temperature of said exhaust gas purification catalyst is equal to or higher than said predetermined temperature in the course of the execution of said fuel cut processing.

In such a construction, when the degree of opening of the wastegate valve (hereinafter, sometimes referred to as the "WGV") is made smaller than the degree of opening in its fully opened state, the exhaust gas (air) channel cross sectional area at the time of the exhaust gas (air) passing through the WGV becomes smaller than that at the time of the WGV being controlled to the fully opened state. For that reason, the exhaust gas (air) passing through the WGV will be throttled by the WGV. In this case, the exhaust gas (air) throttled by the WGV thereafter has a tendency to spread with diffusion to the exhaust gas (air) channel cross sectional area in the bypass passage or the exhaust passage. Then, if such an exhaust gas (air) flows into the exhaust gas purification catalyst, without being rectified or regulated by the bypass passage. It becomes easy to flow into a wide range in the upstream side end face of the exhaust gas purification catalyst.

In contrast to this, when the degree of opening of the WGV is controlled to the degree of opening in its fully opened state, a situation in which the exhaust gas (air) is diffused by the WGV will be suppressed as much as possible. As a result, the exhaust gas (air) becomes easy to flow into the narrow range in the upstream side end face of the exhaust gas purification catalyst. Accordingly, the controller controls the WGV to its fully opened state during the execution of fuel cut in the catalyst's high temperature state, thereby making it possible to suppress the exhaust gas purification catalyst from being deteriorated in the relatively wide range thereof.

Here, note that in cases where it is assumed that the WGV has a structure in which the degree of opening thereof changes as a valve body portion thereof swingably supported at its one side swings, when the WGV is arranged at the outlet of the bypass passage, the flow of the bypass exhaust gas (air) is guided by the valve body portion. Then, even if the degree of opening of the WGV is made smaller than the degree of opening in its fully opened state, the exhaust gas (air) throttled by the WGV flows into the exhaust gas purification catalyst, before spreading with diffusion to the exhaust gas (air) channel cross sectional area in the exhaust passage. This is not limited to the case where the WGV having the above-mentioned structure is arranged at the outlet of the bypass passage, and is also the same as the case where the WGV is arranged in the predetermined downstream side portion of the bypass passage including its outlet. However, even with the WGV of such a structure, if the WGV is arranged in the bypass passage at the upstream side of the predetermined downstream side portion including its outlet, when the degree of opening of the WGV is made smaller than the degree of opening in its fully opened state, the exhaust gas (air) throttled by the WGV tends to spread with diffusion to the exhaust gas (air) channel cross sectional area in the bypass passage or the exhaust passage. Then, if such an exhaust gas (air) flows into the exhaust gas purification catalyst, without being regulated by the bypass passage, it becomes easy to flow into a wide range in the upstream side end face. Accordingly, in such a case, by controlling the WGV to its fully opened state, the situation in which the exhaust gas (air) is diffused by the WGV can be suppressed as much as possible, thus making it possible to suppress the exhaust gas purification catalyst from being deteriorated in the relatively wide range thereof.

Moreover, the exhaust gas purification system for an internal combustion engine according to the present disclosure may be further comprised a wastegate valve that is arranged in a predetermined downstream side portion of said bypass passage including its outlet, with an exhaust gas channel cross sectional area in said bypass passage being able to be changed, said wastegate valve having a structure in which a degree of opening of said wastegate valve changes as a valve body portion thereof swings with one side thereof supported, so that the direction of the flow of said bypass exhaust gas changes when the degree of opening of said wastegate valve changes, said wastegate valve being constructed so as to direct the direction of the flow of said bypass exhaust gas to the upstream side end face of said exhaust gas purification catalyst in a predetermined opening degree range. Then, said controller may be further configured to control the degree of opening of said wastegate valve to a first predetermined opening degree at the time of warming up said exhaust gas purification catalyst, and the controller may control the degree of opening of said wastegate valve in such a manner that the degree of opening of said wastegate valve becomes a second predetermined opening degree which is different from said first predetermined opening degree, when the temperature of said exhaust gas purification catalyst is equal to or higher than said predetermined temperature in the course of the execution of said fuel cut processing.

Said controller controls the degree of opening of the WGV to the first predetermined opening degree at the time of warming up the exhaust gas purification catalyst. Here, when the temperature of the exhaust gas purification catalyst is low, the purification or removal rate of the exhaust gas purification catalyst is apt to become low. For that reason, it is desirable that at the time of warming up the exhaust gas purification catalyst, the deterioration of the catalyst be small in a flow passage range (hereinafter, sometimes referred to also as a "warming-up flow passage range") in the exhaust gas purification catalyst through which the exhaust gas mainly flows at this time. Accordingly, during the execution of fuel cut in the catalyst's high temperature state, said controller controls the degree of opening of the WGV in such a manner that the degree of opening of the WGV becomes the second predetermined opening degree which is different from the first predetermined opening degree.

Here, with the WGV having the structure as mentioned above, the flow of the bypass exhaust gas is guided by the valve body portion of the WGV. For that reason, when the degree of opening of the WGV changes, the direction of the flow of the bypass exhaust gas will change. Moreover, said WGV is constructed so as to direct the direction of the flow of the bypass exhaust gas toward the upstream side end face of the exhaust gas purification catalyst in the predetermined opening degree range. Then, when such a WGV is arranged in the predetermined downstream side portion of the bypass passage including its outlet, if the degree of opening of the WGV falls within the predetermined opening degree range, the bypass exhaust pas guided by the valve body portion of the WGV has a tendency to flow into the upstream side end face, before spreading. Here, said first predetermined opening degree and said second predetermined opening degree fall within said predetermined opening degree range. Then, there is a difference in the inflow range of the bypass exhaust gas in the upstream side end face (the bypass exhaust gas flowing into the upstream side end face, before diffusing) between when the degree of opening of the WGV is the first predetermined opening degree, and when the degree of opening of the WGV is the second predetermined opening degree.

Further, by means of the deterioration suppression control, the exhaust gas (air) during the execution of fuel cut in the catalyst's high temperature state flows through the narrow range of the exhaust gas flow passage or channel in the exhaust gas purification catalyst. Then, when the controller controls the degree of opening of the WGV, during the execution of fuel cut in the catalyst's high temperature state, in such a manner that the degree of opening of the WGV becomes the second predetermined opening degree different from the first predetermined opening degree, in the exhaust gas flow passage in the exhaust gas purification catalyst, a range in which the exhaust gas (air) flows during the execution of fuel cut in the catalyst's high temperature state becomes different from a range in which the exhaust gas mainly flows at the time of warming up the exhaust gas purification catalyst. In other words, a range in the exhaust gas purification catalyst in which the catalyst tends to deteriorate easily during the execution of fuel cut in the catalyst's high temperature state becomes different from the warming-up flow passage range. Thus, the deterioration of the exhaust gas purification catalyst in the warming-up flow passage range is suppressed as much as possible by the control of the degree of opening of the WGV by means of the controller. As a result, the occurrence of a situation is suppressed where exhaust emissions deteriorate at the time of warming up the exhaust gas purification catalyst.

In addition, said first predetermined opening degree may be set in such a manner that when the degree of opening of said wastegate valve is controlled to said first predetermined opening degree by said controller, said bypass exhaust gas flows into a first predetermined region which is on the upstream side end face of said exhaust gas purification catalyst, and which includes a central portion on the upstream side end face of said exhaust gas purification catalyst. Then, said second predetermined opening degree is set in such a manner that when the degree of opening of said wastegate valve is controlled to said second predetermined opening degree by said controller, said bypass exhaust gas flows into a second predetermined region which is on the upstream side end face of said exhaust gas purification catalyst, and which is at the outer side of said first predetermined region.

When the first predetermined opening degree and the second predetermined opening degree are set in this manner, the exhaust gas will flow into the first predetermined region at the time of warming up the exhaust gas purification catalyst, whereas the exhaust gas (air) will flow into the second predetermined region during the execution of fuel cut in the catalyst's high temperature state. Then, because the first predetermined region includes the central portion on the upstream side end face, when the exhaust gas flows into the first predetermined region, the transfer of heat between the exhaust gas and the wall surface of the exhaust passage is suppressed. In other words, a situation where at the time of warming up the exhaust gas purification catalyst, heat moves from the exhaust gas to the wall surface of the exhaust passage is suppressed. With this, the temperature of the exhaust gas flowing into the exhaust gas purification catalyst can be made as high as possible at the time of warming up the exhaust gas purification catalyst. As a result, it becomes possible to warm up the exhaust gas purification catalyst early.

Moreover, during the execution of fuel cut in the catalyst's high temperature state, the exhaust gas (air) flows into the second predetermined region at the outer side of the first predetermined region, so the deterioration of the exhaust gas purification catalyst in the warming-up flow passage range is suppressed as much as possible. As a result, the situation where exhaust emissions deteriorate at the time of warming up the exhaust gas purification catalyst is suppressed.

Further, when the temper attire of said exhaust gas purification, catalyst changes from a temperature equal to or higher than said predetermined temperature to a temperature lower than said predetermined temperature, in the course of the execution of said fuel cut processing, said controller may terminate said deterioration suppression control, and may control, the degree of opening of said turbo bypass valve and the degree of opening of said throttle valve in such a manner that the degree of opening of said turbo bypass valve becomes a predetermined reference TBV opening degree which is a normal degree of opening of said turbo bypass valve in the course of the execution of said fuel cut processing, and the degree of opening of said throttle valve becomes a predetermined reference throttle opening degree which is a normal degree of opening of said throttle valve in the course of the execution of said fuel cut processing.

In other words, when the temperature of said exhaust gas purification catalyst changes from a temperature equal to or higher than said predetermined temperature to a temperature lower than said predetermined temperature, in the course of the execution of said fuel cut processing, said controller may control the degree of opening of said turbo bypass valve and the degree of opening of said throttle valve to a TBV opening degree and a throttle opening degree, respectively, based on the normal control accompanying the execution of fuel cut processing. With this, a feeling of deceleration of a vehicle with the internal combustion engine mounted thereon in the course of the execution of fuel cut processing is improved. In addition, a sudden acceleration of the vehicle at the time of returning from the fuel cat processing can be suppressed.

According to the present disclosure, it is possible to suppress the deterioration of an exhaust gas purification catalyst arranged in an exhaust passage of an internal combustion engine as much as possible.

BRIEF DESCRIPTION OF DRAWINGS

FIG. 1 is a diagram showing the general configuration of an internal combustion engine and its intake and exhaust systems according to a first embodiment of the present disclosure.

FIG. 2 is a diagram showing the general configuration of a bypass passage according to this embodiment.

FIG. 3 is a view schematically showing a mode in which an exhaust gas discharged from the internal combustion engine flows into a three-way catalyst.

FIG. 4 is a view schematically showing a mode in which an exhaust gas (air) flows into the three-way catalyst at the time when deterioration suppression TBV control is carried out.

FIG. 5 is a first view schematically showing a mode in which the exhaust gas (air) flows into the three-way catalyst at the time when deterioration suppression throttle control is carried out with deterioration suppression TBV control.

FIG. 5B is a view schematically showing a mode in which the exhaust gas (air) flows into the three-way catalyst at the time when only deterioration suppression throttle control is carried out.

FIG. 6 is a time chart showing the changes over time of an accelerator opening degree, a request flag, an execution flag, a catalyst temperature, a TBV opening degree, and a throttle opening degree, at the time when control according to the first embodiment of the present disclosure is carried out.

FIG. 7 is a flow chart showing a control flow of the control shown in FIG. 6.

FIG. 8 is a second view schematically showing a mode in which the exhaust gas (air) flews into the three-way catalyst at the time when deterioration suppression throttle control is carried out with deterioration suppression TBV control.

FIG. 9 is a diagram showing the general configuration of an internal combustion engine and its intake and exhaust systems according to a second embodiment of the present disclosure.

FIG. 10 is a time chart showing the changes over time of an accelerator opening degree, a request flag, an execution flag, a catalyst temperature, a TBV opening degree, a throttle opening degree, and a WGV opening degree, at the time when control according to the second embodiment of the present disclosure is carried out.

FIG. 11 is a flow chart showing a control flow of the control shown in FIG. 10.

FIG. 12 is a view schematically showing a mode in which the exhaust gas (air) flows into a three-way catalyst at the time when deterioration suppression TBV control and deterioration suppression throttle control are carried out, and when the WGV opening degree is controlled to an opening degree D1.

FIG. 13 is a diagram showing the general configuration, of a WGV according to a third embodiment of the present disclosure.

FIG. 14A is a view schematically showing a mode in which an exhaust gas (air) flows into a three-way catalyst at the time when the three-way catalyst is warmed up.

FIG. 14B is a view schematically showing a mode in which the exhaust gas (air) flows into a three-way catalyst at the time when deterioration suppression TBV control and deterioration suppression throttle control are carried out, and when the WGV opening degree is controlled to an opening degree D2 (a second predetermined opening degree).

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

First Embodiment (General Configuration of Internal Combustion Engine and its Intake and Exhaust Systems)

FIG. 1 is a diagram showing the general configuration of an internal combustion engine and its intake and exhaust systems according to a first embodiment of the present disclosure. The internal combustion engine 1 shown in FIG. 1 is a spark ignition type internal combustion engine (gasoline engine) provided with a cylinder group including four cylinders 2. On the internal combustion engine 1, there are mounted fuel injection valves 3 for injecting fuel into intake port, respectively. Here, note that the fuel injection valves 1 may be constructed in such a manner as to directly inject fuel into the individual cylinders 2. In addition, on the individual cylinders 2, there are mounted spark plugs (illustration omitted) for igniting air fuel mixtures in the cylinders, respectively.

An intake manifold 40 and an exhaust manifold 50 are connected to the internal combustion engine 1. An intake passage 4 is connected to the intake manifold 40. In the middle of this intake passage 4, there is arranged a compressor 60 of a turbocharger 6 that is driven to operate with the use of the energy of an exhaust gas as a driving source. Also, a throttle valve 41 is arranged in the intake passage 4 at the downstream side of the compressor 60. The throttle valve 41 serves to adjust the amount of intake air in the internal combustion engine 1 by changing the intake air channel cross sectional area of the intake passage 4. Then, in the intake passage 4 at the downstream side of the throttle valve 41, there is arranged an intercooler 42 for performing heat exchange between intake air and outside air. In addition, a pressure sensor 44 is arranged in the intake passage 4 at a location between the compressor 60 and the throttle valve 41. The pressure sensor 44 outputs an electrical signal corresponding to a pressure of intake air at the upstream side of the throttle valve 41 (i.e., a boost pressure). Also, an air flow meter 43 is arranged in the intake passage 4 at the upstream side of the compressor 60. The air flow meter 43 outputs an electrical signal corresponding to an amount (mass) of intake air (air) flowing in the intake passage 4.

On the other hand, a turbine 61 of the turbocharger 6 is arranged in the middle of the exhaust passage 5. Also, in the exhaust passage, there is arranged a bypass passage 52 which bypasses the turbine 61. The bypass passage 52 branches from a branch portion 5b of the exhaust passage 5 at the upstream side of the turbine 61, and joins to a merge portion 5c thereof at the downs cream aide of the turbine 61. Here, the exhaust passage 5, which leads from the branch portion 5b to the merge portion 5c passing through the turbine 61, is referred to as a turbine side exhaust passage 5a. Then, a turbo bypass calve (TBV) 53 is arranged in this turbine side exhaust passage 5a between the branch portion 5b and the turbine 61. The TBV 53 adjusts the flow rate of the exhaust gas passing through the turbine 61 by changing its channel cross sectional area for the exhaust gas flowing through the turbine side exhaust passage 5a. Here, note that the TBV 53 may be arranged in the turbine side exhaust passage 5a between the turbine 61 and the merge portion 5c. In addition, a three-way catalyst 51, acting as the exhaust gas purification catalyst, is arranged in the exhaust passage 5 at the immediately downstream side of the merge portion 5c. An oxygen storage material such as noble metal, e.g., platinum (Pt), etc., or ceria (CeO2), etc., is supported by the three-way catalyst 51. Moreover, a temperature sensor 55 is arranged in the exhaust passage 5 at the downstream side of the three-way catalyst 51. The temperature sensor 55 outputs an electrical signal corresponding to the temperature of the intake air having passed through the three-way catalyst 51.

Here, FIG. 2 is a diagram showing the general configuration of the bypass passage 52 according to this embodiment. Here, note that in FIG. 2, in order to explain the flow of the exhaust gas flowing out from the bypass passage 52 into the exhaust passage 5 (hereinafter, referred to as the "bypass exhaust gas"), the TBV 53 in FIG. 2 is put to a fully closed state. In addition, in FIG. 2, arrows indicate the direction of the flow of exhaust gas. As shown in FIG. 2, the exhaust gas flowing through the exhaust passage 5 passes through the branch portion 5b by way of the bypass passage 52. Then, the exhaust gas passing through the bypass passage 52 and flowing out from the merge portion 5c (the bypass exhaust gas) into the exhaust passage 5 flows into the three-way catalyst 51. Here, the bypass passage 52 according to this embodiment is constructed in such a manner as to direct the direction of the flow of the bypass exhaust gas to an upstream side end face 51a of the three-way catalyst 51 (hereinafter, sometimes referred to simply as an "upstream side end face 51a"). Here, note that a hatched region in FIG. 2 represents the upstream side end face 51a. Moreover, the bypass passage 52 is constructed in such a manner that the diameter thereof (indicated by Dia1 in FIG. 2) becomes smaller than the diameter of the upstream side end face 51a (indicated, by Dia2 in FIG. 2). In other words, in this embodiment, the bypass passage 52 is constructed so that it becomes easy for the bypass exhaust gas to directly flow into the upstream side end face 51a without colliding with the wall surface of the exhaust passage 5. Here, note that the bypass passage 52 shown in FIG. 2 is constructed so that the diameter thereof becomes substantially constant over the entire bypass passage 52, but there is no intention to limit to this, and the bypass passage 52 according to this embodiment should only be formed so that the diameter of its outlet 52a becomes smaller than the diameter of the upstream side end face 51a.

Then, an electronic control unit (ECU) 10 is provided in combination with the internal combustion engine 1. This ECU 10 is a unit that controls the operating state of the internal combustion engine 1, etc. A variety of kinds of sensors such as a crank position sensor 14, an accelerator position sensor 15, etc. in addition to the air flow meter 43, the pressure sensor 44 and the temperature sensor 55 mentioned above are electrically connected to the ECU 10. The crank position sensor 14 is a sensor which outputs art electrical signal correlated with the rotational position of an engine output shaft (crankshaft) of the internal combustion engine 1. The accelerator position sensor 15 is a sensor which outputs an electrical signal correlated with an amount of operation of an accelerator pedal 16 (hereinafter, sometimes referred to as an accelerator opening) of a vehicle on which the internal combustion engine 1 is mounted. Then, the output signals of these sensors are inputted to the ECU 10. The ECU 10 derives an engine rotational speed of the internal combustion engine 1 based on the output signal of the crank position sensor 14, and also derives an engine load of the internal combustion engine 1 based on the output signal of the accelerator position sensor 15. In addition, the ECU 10 estimates a flow rate of the exhaust gas discharged from the internal combustion engine 1 (hereinafter, sometimes referred to as an "exhaust gas flow rate") based on the output value of the air flow meter 43, and estimates a temperature of the three-way catalyst 51 (hereinafter, also sometimes referred to as a "catalyst temperature") based on the output value of the temperature sensor 55.

In addition, a variety of kinds of equipment such as the individual fuel injection valves 3, the throttle valve 41, the TBV 53, etc., as mentioned above, are electrically connected to the ECU 10. Thus, these variety of kinds of equipment are controlled by the ECU 10. In other words, the degree of opening of each of the throttle valve 41 and the TBV 53 is controlled by the ECU 10.

(Fuel Cut Processing)

In the internal combustion engine 1 according to this embodiment, when the operating state thereof becomes a deceleration operation, fuel cut processing is carried out. Specifically, the ECU 10 stops the fuel injection from each fuel injection valve 3, whereby fuel cut processing to stop the supply of fuel into the cylinders 2 during the operation of the internal combustion engine 1 is carried out. Here, when the fuel cut processing is carried out, the air having flowed into the internal combustion engine 1 is discharged from the internal combustion engine 1, without being used for combustion, is a result, the air flows into the three-way catalyst 51, so oxygen will be supplied to the three-way catalyst 51. Here, note that the ECU 10 functions as a controller according to the present disclosure, by carrying out the fuel cut processing in this manner.

Here, the oxygen storage material such as ceria ($CeO_2$), etc., supported on the three-way catalyst 51 acts to store and release oxygen, so a variation in the atmosphere of the exhaust gas can be suppressed, as a consequence of which when oxygen is supplied to the three-way catalyst 51 in this manner, the oxygen thus supplied is stored by the oxygen storage material. In addition, it has been known that when oxygen is supplied to the three-way catalyst 51 in this manner at the time when the catalyst temperature is relatively high, the three-way catalyst 51 becomes easy to be deteriorated. Then, it is considered that the storage of oxygen by the oxygen storage material (i.e., oxidation of the oxygen storage material) In the three-way catalyst 51, the temperature of which is relatively high, is one of the factors of such a deterioration of the three-way catalyst 51.

Here, if a lower limit value of temperatures at which the three-way catalyst 51 becomes easy to be deteriorate at the time when oxygen is supplied to the three-way catalyst 51 is defined as a catalyst deterioration temperature, when the catalyst temperature is equal to or higher than the catalyst deterioration temperature in the course of the execution of the fuel cut processing (hereinafter, sometimes referred to as "during the execution of fuel cut in a catalyst's high temperature state"), the three-way catalyst 51 becomes easy to be deteriorated. On the other hand, when the catalyst temperature is lower than the catalyst deterioration temperature in the course of the execution of the fuel cut processing (hereinafter, sometimes referred to as "during the execution of fuel cut in a catalyst's normal state"), the three-way catalyst 51 becomes hard to be deteriorated in comparison with during the execution of fuel cut in the catalyst's high temperature state. Here, note that the exhaust gas purification catalyst which can be deteriorated during the execution of fuel cut in the catalyst's high temperature state is not limited to the three-way catalyst 51, but even in the case of other exhaust gas purification catalysts having oxygen storage ability, the catalysts may be deteriorated during the execution of fuel, cut in the catalyst's high temperature state. In addition, the catalyst deterioration temperature in this embodiment corresponds to a predetermined temperature according to the present disclosure.

In the construction in which the turbine 61 is arranged in the exhaust passage 5 at the upstream side of the three-way catalyst 51, the three-way catalyst 51 may be deteriorated in a relatively wide range thereof dating the execution of fuel cut in the catalyst's high temperature state. This will be explained below based on FIG. 3. FIG. 3 is a view schematically showing a mode in which the exhaust gas discharged from the internal combustion engine 1 flows into the three-way catalyst 5. Here, (b) In FIG. 3 is a schematic diagram showing the upstream side end face 51a of the three-way catalyst 51, and is a view for explaining an inflow range of the exhaust gas in the upstream side end face 51a. Here, note that in FIG. 3, the TBV 53 is put to its fully opened state, wherein an exhaust gas flowing out from the turbine side exhaust passage 5a into the exhaust passage 5 (hereinafter, sometimes referred to as a "turbine exhaust gas") and an exhaust gas flowing out from the bypass passage 52 into the exhaust passage 5 (a bypass exhaust gas) flow into the three-way catalyst 51. In addition, in (a) of FIG.

3, arrows indicate the direction of the flow of exhaust gas. As shown in (a) of FIG. 3, when the exhaust gas flowing through the turbine side exhaust passage ha passes through the turbine 61, the exhaust gas will be disturbed by the turbine 61. As a result, she exhaust gas flowing through the turbine side exhaust passage 5a will flow out into the exhaust passage 5 in a diffused state. In other words, the turbine exhaust gas will diffuse. Then, the turbine exhaust gas diffused in this manner joins the bypass exhaust gas, and flows into the three-way catalyst 51. At this time, the inflow range of the exhaust gas in the upstream side end face 51a is represented by a hatched region enclosed with a broken line C1 in (b) of FIG. 3. Then, as shown in (b) of FIG. 3, the exhaust gas at this time will flow into a relatively wide range of the upstream side end face 51a.

Then, when fuel cut processing is carried out in the state shown in FIG. 3, the air discharged from the internal combustion engine 1 flows into the relatively wide range of the upstream side end face 51a. In that case, the air will flow through the relatively wide range of the three-way catalyst 51. In other words, oxygen will be supplied to the relatively wide range of the three-way catalyst 51. As stated above, when oxygen is supplied to the three-way catalyst 51 at the time when the catalyst temperature is relatively high, the three-way catalyst 51 becomes easy to be deteriorated. For that reason, when air flows into the relatively wide range of the upstream side end face 51a during the execution of fuel cut in the catalyst's high temperature state, the three-way catalyst 51 may be deteriorated in the relatively wide range of the catalyst.

(Opening Degree Control of TBV and Throttle Valve)

In this embodiment, in order to suppress the deterioration of the three-way catalyst 51 as much as possible, the ECU 10 controls the degrees of opening of the turbo bypass valve 53 and the throttle valve 41 in such a manner that during the execution of fuel cut in the catalyst's high temperature state, the degree of opening of the turbo bypass valve 53 (hereinafter, sometimes referred to as the "TBV opening degree") and the degree of opening of the throttle valve 41 (hereinafter, sometimes referred to as the "throttle opening degree") are controlled to a TBV opening degree and a throttle opening degree which are different from their predetermined reference opening degrees, respectively. Here, note that the predetermined reference opening degree with respect to the TBV opening degree (hereinafter, sometimes referred to as the "predetermined reference TBV opening degree") and the predetermined reference opening degree with respect to the throttle opening degree thereinafter, sometimes referred to as the "predetermined reference throttle opening degree") are a TBV opening degree and a throttle opening degree, respectively, which are based on the control normally carried out by the ECU 10 accompanying the fuel cut processing, during the execution of fuel cut in the catalyst's normal state. These will be explained below in detail.

As mentioned above, during the execution of fuel cut in one catalyst's normal state, the three-way catalyst 51 becomes harder to be deteriorated in comparison with during the execution of fuel cut in the catalyst's high temperature state. Thus, in the state where the three-way catalyst 51 is hard to be deteriorated, the ECU 10 controls the TBV opening degree to the predetermined reference TBV opening degree. Here, nope that the predetermined reference TBV opening degree is a TBV opening degree at which a decrease in the catalyst temperature can be suppressed, during the execution of fuel cut in the catalyst's normal state in which the catalyst temperature is relatively low. Here, the larger the TBV opening degree, the more the flow rate of the turbine exhaust gas (air) increases, so the transfer of heat from the turbine 61 to the exhaust gas (air) is promoted, as a result of which the temperature of the exhaust gas (air) flowing into the three-way catalyst 51 tends to become high easily. For that reason, when the predetermined reference TBV opening degree is set, for example, to a degree of opening ah which the TBV 53 is in its fully opened state, the decrease of the catalyst temperature is suppressed as much as possible, in the course of the execution of fuel cut in the catalyst's normal state.

Moreover, the ECU 10 controls the throttle opening degree to the predetermined reference throttle opening degree during the execution of fuel cut in the catalyst's normal state. Here, one predetermined reference throttle opening degree is set to a degree of opening which falls within a predetermined range. Then, a lower limit side of this predetermined range is set, for example, based on a degree of opening at which a so-called oil loss through piston ring in which lubricating oil enters a cylinder 2 can be suppressed. Also, an upper limit side of this predetermined range is set, for example, based on a degree of opening at which a feeling of deceleration of the vehicle can be obtained. Further, the lower limit side of the predetermined range can also be set in consideration of suppression of misfire at the time of returning from the fuel cut processing, and its accompanying engine stall. In addition, the upper limit side of the predetermined range can also be set in consideration of suppression of sudden acceleration of the vehicle at the time of returning from the fuel cut processing.

In contrast to this, during the execution of fuel cut in the catalyst's high temperature state, the three-way catalyst 51 becomes easy to be deteriorated, as mentioned above. Further, the exhaust gas (in this case, the exhaust gas being air discharged from the internal combustion engine 1) may diffuse before flowing into the three-way catalyst 51, and when the exhaust gas (air) thus diffused flows through a relatively wide range of an exhaust gas flow passage or channel in the three-way catalyst 51, the catalyst 51 may be deteriorated in a relatively wide range thereof. Accordingly, during the execution of fuel cut in the catalyst's high temperature state, the ECU 10 controls the TBV opening degree so that the TBV opening degree becomes smaller than the predetermined reference TBV opening degree (hereinafter, this control being sometimes referred to as "deterioration suppression TBV control"). Moreover, during the execution of fuel cut in the catalyst's high temperature state, the ECU 10 controls the throttle opening degree so that the throttle opening degree becomes larger than the predetermined reference throttle opening degree (hereinafter, this control being sometimes referred to as "deterioration suppression throttle control"). This will be explained below based on FIG. FIG. 5A and FIG. 5B. Here, note that the deterioration suppression TBV control and the deterioration suppression throttle control in this embodiment correspond to deterioration suppression control according to the present disclosure.

First, the deterioration suppression TBV control will be described. FIG. 4 is a view schematically showing a mode in which the exhaust gas (air) flows into the three-way catalyst 51 at the time when deterioration suppression TBV control is carried out. Here, (b) in FIG. 4 is a schematic diagram showing the upstream side end face 51a of the three-way catalyst 51, and is a view for explaining the inflow range of the exhaust gas (air) in the upstream side end face 51a. Here, in order to explain the operation of the deterioration suppression TBV control, the deterioration suppression throttle control is not carried out in the control shown in FIG. 4 (in other words, a state being shown where the throttle opening degree is controlled to the predetermined reference throttle opening degree). In addition, in (a) of FIG. 4, arrows indicate the direction of the flow of exhaust gas (air). Then, in the deterioration suppression TBV control shown in FIG. 4, the TBV opening degree is controlled to a degree of opening in its fully closed state.

As shown in FIG. 4, when the TBV opening degree is controlled to the degree of opening in its fully closed state, the flow rate of the turbine exhaust gas (air) is substantially set to 0, so only the bypass exhaust gas (air) will flow into the three-way catalyst 51. In other words, the inflow of the turbine exhaust gas (air) to the three-way catalyst 51 disturbed by the turbine 61 is stopped. This serves to suppress the exhaust gas (air) from diffusing, before flowing into the three-way catalyst 51, as much as possible. At this time, the inflow range of the exhaust gas (air) in the upstream side end face 51a is represented by a hatched region enclosed with a broken line C2 in (b) of FIG. 4. In addition, the broken line C1 shown in (b) of the above-mentioned FIG. 3 is also shown in (b) of FIG. 4. Then, as shown in (b) of FIG. 4, the exhaust gas (air) at this time will flow into a relatively narrow range of the upstream side end face 51a, in comparison with the case where the normal control is carried out accompanying the fuel cut processing (in this case, the TBV opening degree being controlled to the predetermined reference TBV opening degree), i.e., in comparison with the region enclosed with the broken line C1.

In addition, when the inflow of the turbine exhaust gas (air) to the three-way catalyst 51 is stopped, the temperature of the exhaust gas (air) flowing into the three-way catalyst 51 becomes easier to decrease, as compared with when it is not stopped. This is because the exhaust gas (air) discharged from the internal combustion engine 1 is suppressed from receiving heat from the turbine 61. Then, the catalyst temperature can be decreased as quickly as possible during the execution of fuel cut in the catalyst's high temperature state where the catalyst temperature is relatively high, by making the temperature of the exhaust gas (air) flowing into the three-way catalyst 51 as low as possible.

Here, note that in the above-mentioned explanation, an example has been described in which the TBV opening degree is controlled to the degree of opening in its fully closed state by means of the deterioration suppression TBV control, but it is needless to say that the TBV opening degree in the deterioration suppression TBV control is not limited to the degree of opening in its fully closed state. In the deterioration suppression TBV control, by making the TBV opening degree smaller than the predetermined reference TBV opening degree, a situation can be suppressed where the exhaust gas (air) diffuses before flowing into the three-way catalyst 51. In addition, when the deterioration suppression TBV control is carried out, the temperature of the exhaust gas (air) flowing into the three-way catalyst 51 is made relatively low, so the catalyst temperature can be decreased relatively quickly, daring the execution of fuel cut in the catalyst's high temperature state.

Next, the deterioration suppression throttle control will be described. FIG. 5A is a first view schematically showing a mode in which the exhaust gas (air) flows into the three-way catalyst 51 at the time when the deterioration suppression throttle control is carried out with the deterioration suppression TBV control. Here, (b) in FIG. 5A is a schematic diagram showing the upstream side end face 51a of the three-way catalyst 51, and is a view for explaining the inflow range of the exhaust gas (air) in the upstream aide end face 51a. In addition, FIG. 5B is a view schematically showing a mode in which the exhaust gas (air) flows into the three-way catalyst 51 at the time when only the deterioration suppression throttle control is carried out. Here, (b) in FIG. 5B is a schematic diagram showing the upstream side end face 51a of the three-way catalyst 51, and is a view for explaining the inflow range of the exhaust gas (air) in the upstream side end face 51a. Here, note that in FIG. 5A, the TBV opening degree is controlled to the degree of opening in its fully closed state, similar to the above-mentioned FIG. 4, and in FIG. 5B, the TBV opening degree is controlled to the degree of opening in its fully opened state, similar to the above-mentioned FIG. 3. In addition, in (a) of FIG. 5A and in (a) of FIG. 5B, arrows indicate the direction of the flow of exhaust gas (air).

In the control shown in FIG. 5A only the bypass exhaust gas (air) flows into the three-way catalyst 51, similar to the above-mentioned FIG. Here, in the control shown in FIG. 5A, the throttle opening degree is made larger than the predetermined reference throttle opening degree, the flow rate of exhaust gas becomes larger, as compared with the above-mentioned FIG. 4 in which the throttle opening degree is controlled to the predetermined reference throttle opening degree. As a result, the flow speed of the exhaust gas (air) flowing through the bypass passage 52 becomes faster, as compared with the above-mentioned FIG. 4. Here, the faster the flow speed of the exhaust gas (air) flowing through the bypass passage 52, the harder it becomes for the bypass exhaust gas (air) flowing out from the bypass passage 52 to diffuse, with respect to the exhaust gas (air) flowing through the bypass passage 52. Accordingly, it becomes harder for the bypass exhaust gas fair) in FIG. 5A to diffuse, as compared with the bypass exhaust gas (air) in the above-mentioned FIG. 4. At this time, the inflow range of the exhaust gas (air) in the upstream side end face 51a is represented by a hatched region enclosed with a broken line C3 in (b) of FIG. 5A. In addition, the broken line C2 shown in (b) of the above-mentioned FIG. 4 is also shown in (b) of FIG. 5A. In that case, as shown in (b) of FIG. 5A, it becomes easier for the exhaust gas (air) at this time to concentrate on the narrow range of the upstream side end face 51a, as compared with the case where only the deterioration suppression TBV control is carried out (i.e., as compared with the broken line C2).

On the other hand, the inflow range of the exhaust gas (air) in the upstream side end face 51a. In the case where only the deterioration suppression throttle control is carried out is represented by a hatched region enclosed with a broken line C4 in (b) of FIG. 5B. In this case, as shown in (b) of FIG. 5B, the exhaust gas (air) flows into a wide range of the upstream side end face 51a. This is because the flow rate of exhaust gas is made large whereby the turbine exhaust gas (air) is increased, as a result of which the extent of diffusion of the exhaust gas (air) before flowing into the three-way catalyst 51 will become large. Accordingly, the deterioration suppression throttle control needs to be carried out in combination with the deterioration suppression TBV control.

As described above, during the execution of fuel cut in the catalyst's high temperature state, when the TBV opening degree is made smaller than the predetermined reference TBV opening degree and the throttle opening degree is made larger than the predetermined reference throttle opening degree, the exhaust gas (air) at this time will flow through the relatively narrow range of the exhaust gas flow passage in the three-way catalyst 51. With this, the three-way catalyst 51 is suppressed from being deteriorated in the relatively wide range thereof during the execution of fuel cut in the catalyst's high temperature state. In other words, the exhaust gas purification system for an internal combustion engine according to the present disclosure makes it possible to suppress the deterioration of the three-way catalyst 51 as much as possible.

(Control Flow)

Next, reference will be made to a control flow executed by the ECU 10 based on FIG. 6 and FIG. 7.

FIG. 6 is a time chart showing the changes over time of an accelerator opening degree, a request flag for fuel cut processing (hereinafter, sometimes referred to simply as a "request flag"), an execution flag for fuel cut processing (hereinafter, sometimes referred to simply as a "execution flag"), the catalyst temperature, the TBV opening degree, and the throttle opening degree, at the time when the deterioration suppression TBV control and the deterioration suppression throttle control are carried out by the ECU 10. Here, the request flag is a flag which is set to 1 when a request for the fuel cut processing is satisfied, and the execution flag is a flag which is set to 1 when an execution condition for the fuel cut processing is satisfied.

Here, note that in the control shown in FIG. 6, the TBV opening degree is controlled to the degree of opening in its fully closed state, and the throttle opening degree is controlled to a control throttle opening degree THctr to be described later by means of the deterioration suppression TBV control and the deterioration suppression throttle control. Further, in the control shown in FIG. 6, in order to suppress as much as possible a situation where oxygen resulting from one diffused turbine exhaust gas (air) flows into the three-way catalyst 51 in she course of controlling the TBV opening degree to the degree of opening in its fully closed state, fuel cut processing is not started, when the TBV opening degree is equal to or larger than a TBV opening degree threshold value TVth. Thus, it can be said that the TBV opening degree threshold value TVth is one of parameters for the execution condition of fuel cut processing according to this embodiment carried out when the catalyst temperature is equal to or higher than the catalyst deterioration temperature. Here, note that the control shown in FIG. 6 is just an example of the deterioration suppression TBV control and the deterioration suppression throttle control, and the deterioration suppression TBV control and the deterioration suppression throttle control in this embodiment are not limited to the control shown in FIG. 6.

Moreover, in the change over time of the catalyst temperature in FIG. 6, a temperature Tcde represents the catalyst deterioration temperature (corresponds to the predetermined temperature according to the present disclosure). Also, in the change over time of the throttle opening degree in FIG. 6, a degree of opening THpr represents the predetermined reference throttle opening degree, and a degree of opening THctr represents the control throttle opening degree. Here, note that in the control shown in FIG. 6, the predetermined reference TBV opening degree is set to the degree of opening in the fully opened state.

Then, as shown in FIG. 6, the accelerator opening degree is made smaller from a time point t0 to a time point t1. Then, the throttle opening degree is controlled to become smaller accordingly. Here, note that such control of the throttle opening degree is control which is usually carried out by the ECU 10. Then, at the time point t1 at which the accelerator opening degree becomes 0, the throttle opening degree becomes the predetermined reference throttle opening degree THpr. Moreover, at the time point t1, the request for the fuel cut processing is satisfied and the request flag is set to 1. Here, the catalyst temperature at the time point t1 becomes equal to or higher than the catalyst deterioration temperature Tcde, and hence, if the normal control accompanying the execution of the fuel cut processing is carried out in this state, i.e., when the TBV opening degree is controlled to the predetermined reference TBV opening degree and the throttle opening degree is controlled to the predetermined reference throttle opening degree, during the execution of the fuel cut processing, the three-way catalyst 51 may be deteriorated in a relatively wide range thereof.

Then, in the control shown in FIG. 6, the deterioration suppression TBV control and the deterioration suppression throttle control are carried out by the ECU 10. In the control shown in FIG. 6, first, at the time point t1 at which the request flag is set to 1 and the catalyst temperature becomes equal to or higher than the catalyst deterioration temperature Tcde, the control to fully close the TBV 53 is started before the start of execution of the fuel cat processing. This is because at the time point t1, the TBV opening degree to be set corresponding to the operating state of the internal combustion engine 1 has become equal to or more than the TBV opening degree threshold value TVth. If the execution of the fuel cut processing is started in such a state, the oxygen resulting from the diffused exhaust gas (air) flow into the three-way catalyst 51, in the course of the control of the TBV opening degree accompanying the deterioration suppression TBV control, as mentioned above.

Subsequently, at the time point t2 at which the TBV opening degree becomes smaller than the TBV opening degree threshold value TVth, the execution flag is set to 1 and the fuel injection from the fuel injection valves 3 is stopped. In other words, the execution of the fuel cut processing is started. Thus, by delaying the start of the execution of the fuel cut processing until the time point t2, the inflow of the oxygen resulting from the diffused turbine exhaust gas (air) to the three-way catalyst 51 is suppressed, thus making it possible to suppress the deterioration of the three-way catalyst 51 in a more suitable manner. Then, as shown in FIG. 6, at the time point t2 when the execution of the fuel cut processing is started, the control in which the throttle opening degree is adjusted to the control throttle opening degree THctr larger than the predetermined reference throttle opening degree THpr is started. Thereafter, the TBV opening degree becomes the degree of opening in its fully closed state, and the throttle opening degree becomes the control throttle opening degree THctr. In other words, when the catalyst temperature is equal to or higher than the catalyst deterioration temperature Tcde during the execution of the fuel cut processing by means of the control shown in FIG. 6, the TBV opening degree (the degree of opening in the fully closed state) becomes smaller than the predetermined reference TBV opening degree (the degree of opening in the fully opened state), and the throttle opening degree (the control, throttle opening degree THctr) becomes larger than the predetermined reference throttle opening degree THpr.

Here, when attention is focused on the change over time of the catalyst temperature, the catalyst temperature will go op immediately after the time point t2 at which the execution of the fuel cut processing is started. This is based on the generation of heat of the oxygen storage material resetting from the storage of oxygen by the oxygen storage material (i.e., oxidation of the oxygen storage material). Thereafter, by the bypass exhaust gas (air) of a relatively low temperature flowing into the three-way catalyst 51, the catalyst temperature drops relatively quickly, and the catalyst temperature becomes lower than the catalyst deterioration temperature Tcde. Then, at a time point t3 at which the catalyst temperature becomes lower than the catalyst deterioration temperature Tcde, the ECU 10 terminates the deterioration suppression TBV control, and the deterioration suppression throttle control, and controls the TBV opening degree and the throttle opening degree in such a manner that the TBV opening degree becomes the degree of opening in the fully opened state (the predetermined reference TBV opening degree), and that the throttle opening degree becomes the predetermined reference throttle opening degree THpr. With this, a feeling of deceleration of the vehicle in the course of the execution of the fuel cut processing is improved. In addition, a sudden acceleration of the vehicle at the time of returning from the fuel cut processing can be suppressed.

Further, FIG. 7 is a flow chart showing a control flow of the above-mentioned control shown in FIG. 6. In this embodiment, this flow or routine is carried out at a predetermined operation interval in a repeated manner by the ECU 10 during the operation of the internal combustion engine 1.

In this flow or routine, first, in step S101, a request, flag Nfrqt is read in. This request flag Nfrqt is a flag which is set to 1, if the request for the fuel cut processing is satisfied. Here, a determination as to whether the request fox the fuel cut processing has been satisfied (i.e., setting of the value of the request flag Nfrqt) is repeatedly made by the ECU 10 at a predetermined operation interval during the operation of the internal combustion engine 1, according to a well-known flow different from this flow. In other words, if a determination is made according to the well-known flow different from this flow that the request for the fuel cut processing has not been satisfied, the value of the request flag Nfrqt is set to 0, whereas if the request for the fuel out processing has been satisfied, the value of the request, flag Nfrqt is set to 1. In step S101, the value of the request flag Nfrqt set in this manner is read in.

Subsequently, in step S102, it is determined in step S102 whether the request flag Nfrqt read in step S101 is 1. Then, if an affirmative determination is made in step S102 (this corresponding to a period of time after the above-mentioned time point t1 in FIG. 6), the routine of the ECU 10 goes to the processing of step S103. Here, note that, as described in the above mentioned explanation of FIG. 6, at the above-mentioned time point t1 of FIG. 6, the throttle opening degree becomes the predetermined reference throttle opening degree THpr by means of the control which is normally carried out by the ECU 10. On the other hand, if a negative determination is made in step S102, the execution of this flow is ended. In this case, the fuel cut processing is not carried out, but the fuel injection from each fuel injection valve 3 is continued.

If an affirmative determination is made in step S102, then in step S103, a catalyst temperature Tc is calculated. In step S103, the catalyst temperature Tc is calculated based on the output signal of the temperature sensor 55.

Subsequently, in step S104, it is determined whether the catalyst temperature Tc calculated in step S103 is equal to or higher than the catalyst deterioration temperature Tcde. Here, the catalyst deterioration temperature Tcde is a temperature at which the three-way catalyst 51 becomes easy to be deteriorated when oxygen is supplied to the three-way catalyst 51, and it has been stored in a ROM of the ECU 10 in advance. Then, if an affirmative determination is made in step S104 (this corresponding to a period of time after the time point t1 and before the time point 13 in the above-mentioned FIG. 6), the routine of the ECU 10 goes to the processing of step S105. On the other hand, if a negative determination is made in step S104 (this corresponding to a period of time after the above-mentioned time point t3 in FIG. 6), the routine of the ECU 10 goes to the processing of step S108.

If an affirmative determination is made in step S104, then in step S105, the TBV opening degree (TV) is controlled so as to become the degree of opening in the fully closed state. Here, note that in the processing of step S105, the ECU 10 inputs a control signal to the TBV 53 so that the TBV opening degree (TV) becomes the degree of opening in the fully closed state, and thereafter, shifts to the following processing of step S106, without waiting until the TBV 53 is actually controlled to the fully closed state.

Then, in step S106, it is determined whether the TBV opening degree (TV) at this time is smaller than the TBV opening degree threshold value TVth. Here, the TBV opening degree threshold value TVth is one of parameters for the execution condition of the fuel cut processing according to this embodiment carried out when the catalyst temperature is equal to or higher than the catalyst deterioration temperature Tcde, as mentioned above, and if has been stored in the ROM of the ECU 10 in advance. Then, if an affirmative determination is made in step S106 (this corresponding to a period of time after the time point t2 and before the time point t3 in the above-mentioned FIG. 6), the routine of the ECU 10 goes to the processing of step S107. On the other hand, if a negative determination is made in step S106 (this corresponding to a period of time after the time point t1 and before the time point t2 in the above-mentioned FIG. 6), this flow or routine is ended. In this case, the request flag Nfrqt is 1, but the fuel cut processing is not yet started. This is because if the fuel cut processing is started in the state where the TBV opening degree (TV) becomes equal to or more than the TBV opening degree threshold value TVth, the oxygen resulting from the diffused exhaust gas (air) may flow into the three-way catalyst 31 in the course of the TBV opening degree being controlled.

If an affirmative determination is made in step S106, i.e., in this case, when the execution condition for the fuel cut processing is satisfied, the ECU 10 carries out the processing of step S107. In the processing of step S107, the ECU 10 stops the fuel injection from the fuel injection valves 3 (in other words, carries out the fuel cut processing), and controls the throttle valve 41 so that the throttle opening degree (TH) becomes the control throttle opening degree THctr. Then, after the processing of step S107, the execution of this flow or routine is ended.

In addition, if a negative determination is made in step S104, i.e., in this case, too, when the execution condition for the fuel cut processing is satisfied, the ECU 10 carries out the processing of step S108. In the processing of step S108, the ECU 10 stops the fuel injection from the fuel injection valves 3 (in other words, carries out the fuel cut processing), and controls the TBV 53 and the throttle valve 41 so that the TBV opening degree (TV) becomes the degree of opening in its fully opened state (this corresponding to the predetermined reference TBV opening degree), and the throttle opening degree (TH) becomes the predetermined reference throttle opening degree THpr. In other words, the ECU 10 carries out the normal control accompanying the execution of the fuel cut processing. Then, after the processing of step S108, the execution of this flow or routine is ended.

The ECU 10 carries out the control flow as mentioned above, whereby when the catalyst temperature is equal to or higher than the catalyst deterioration temperature Tcde during the execution of the fuel cut processing, the TBV opening degree (the degree of opening in the fully closed state) becomes smaller than the predetermined reference TBV opening degree (the degree of opening in the fully opened state), and the throttle opening degree (the control throttle opening degree THctr) becomes larger than the predetermined reference throttle opening degree THpr. With this, it becomes possible to suppress the deterioration of the three-way catalyst 51 as much as possible.

Then, in this embodiment, a controller according to the present disclosure is achieved by the ECU 10 carrying out the processing of steps S105 and S107 of the above-mentioned flow shown in FIG. 7. Here, note that it is needless to say that the TBV opening degree in the deterioration suppression TBV control should just be smaller than the predetermined reference TBV opening degree, and is not limited to the degree of opening in its fully closed state. Also, it is needless to say that the TBV opening degree in the normal control (the predetermined reference TBV opening degree) accompanying the execution of the fuel cut processing is not limited to the degree of opening in its fully opened state. In addition, the above-mentioned flow shown in FIG. 7 is just an example (i.e., an example in which the start of the execution of the fuel cut processing is delayed until the TBV opening degree becomes smaller than the TBV opening degree threshold value TVth), and in this embodiment, the processing of step S106 can also be omitted.

Modification of the First Embodiment

Next, reference will be made to a modification of the above-mentioned first embodiment of the present disclosure based on FIG. 8. Here, note that in this modification, the detailed explanation of substantially one same construction and substantially the sauce control processing as in the above-mentioned first embodiment will be omitted.

FIG. 8 is a view schematically showing a mode in which exhaust gas (air) flows into a three-way catalyst 51 at the time when deterioration suppression throttle control is carried out with deterioration suppression TBV control, similar to FIG. 5A. Here, (b) in FIG. 3 is a schematic diagram showing an upstream side end face 51a of the three-way catalyst 51, and is a view for explaining an inflow range of the exhaust gas (air) in the upstream side end face 51a. Then, in the construction shown in FIG. 8, a tapered portion 52b is formed in a bypass passage 52. The tapered portion 52b is formed in such a manner that the channel cross section of the bypass passage 52 becomes gradually smaller toward its outlet 52a.

In such a construction, the inflow range of the exhaust gas (air) in the upstream side end face 51a is represented by a hatched region enclosed with a broken line C5 in (b) of FIG. 8. In addition, the above-mentioned broken line C3 shown in (b) of FIG. 5A is also shown in (b) of FIG. 8. Then, as shown in (b) of FIG. 8, it becomes easier for the exhaust gas (air) at this time to concentrate on a narrower range of the upstream side end face 51a, as compared with the case where the tapered portion 52 is not formed as shown in the above-mentioned FIG. 5A (i.e., as compared with the broken line C3).

According to this modification, the exhaust gas (air) will flow through the narrower range of the exhaust gas flow passage in the three-way catalyst 51. Accordingly, the three-way catalyst 51 is suppressed from being deteriorated in a relatively wade range thereof in a suitable manner during the execution of fuel cut in the catalyst's high temperature state. In other words, the deterioration of the three-way catalyst 51 is suppressed as much as possible.

Second Embodiment

Next, reference will be made to a second embodiment of the present disclosure based on FIG. 9 through FIG. 11.

Here, note that in this second embodiment, the detailed explanation of substantially the same construction and substantially the same control processing as in the above-mentioned first embodiment will be omitted.

FIG. 9 is a diagram showing the general configuration of an internal combustion engine and its intake and exhaust systems according to this second embodiment of the present disclosure. In addition to she above-mentioned configuration shown in the FIG. 1, the configuration shown in FIG. 9 is provided with a wastegate valve (WGV) 54 which is arranged in a bypass passage 52 at the downstream side of a substantially middle portion between its inlet 52c and its outlet 52a. The WGV 54 adjusts the flow rate of the exhaust gas flowing through the bypass passage 52 by changing an exhaust gas channel cross sectional area in the bypass passage 52. Then, the degree of opening of the WGV 54 (hereinafter, sometimes referred to as the "WGV opening degree") is controlled by an ECU 10. Here, when the exhaust gas passing through the WGV 53 is throttled by the WGV 54, the exhaust gas thus throttled has a tendency to spread with diffusion to the exhaust gas channel cross sectional area in the bypass passage 52 or an exhaust passage 5. Then, if such an exhaust gas flows into a three-way catalyst 51 without being rectified or regulated by the bypass passage 52, it becomes easy to flow into a wide range in an upstream side end face 51a of the three-way catalyst 51.

Here, assuming that the WGV 54 has a structure in which a valve body portion thereof is swingably supported at its one side so that the degree of opening thereof is changed by the swinging of the valve body portion, when the WGV 54 is arranged in a predetermined downstream side portion 52d (indicated by a hatching region in FIG. 9) of the bypass passage 52 including the outlet 52a, the flow of the exhaust gas will be guided by the valve body portion, so that even if the WGV opening degree is made smaller than the degree of opening in its fully opened state, the exhaust gas flows into the three-way catalyst 51, before spreading with diffusion to the exhaust gas channel cross sectional area in the exhaust passage 5. However, in the configuration shown in FIG. 9, the WGV 54 is arranged at the upstream side of the downstream side portion 52d, as a result of which when the WGV opening degree is made smaller than the degree of opening in its fully opened state, the exhaust gas throttled by the WGV 54 tends to spread with diffusion to the exhaust gas channel cross sectional area in the bypass passage 52 or the exhaust passage 5. Then, if such an exhaust gas flows into the three-way catalyst 51 without being regulated by the bypass passage 52, it becomes easy to flow into a wide range in the upstream side end face 51a of the three-way catalyst 51.

Here, in this second embodiment, reference will be made to a control flow executed by the ECU 10 based on FIG. 10 and FIG. 11.

FIG. 10 is a time chart showing the changes over time of an accelerator opening degree, a request flag, an execution flag, a catalyst temperature, a TBV opening degree, a throttle opening degree, and a WGV opening degree, at the time when deterioration suppression TBV control and deterioration suppression throttle control by the ECU 10 are carried out according to this second embodiment of the present disclosure. Here, note that in the explanation of FIG. 10, what is different from the above-mentioned explanation of FIG. 6 will be mainly explained. In addition, in the control shown in FIG. 10, the WGV opening degree is controlled so as to become the degree of opening in the fully opened state, during the execution of fuel cut in the catalyst's high temperature state, as will be described later.

At a time point t0 in FIG. 10, the internal combustion engine 1 performs a boost operation. Then, according to an operating state at this time, the TBV opening degree is controlled to the degree of opening in the fully opened state, and the WGV opening degree is controlled to a relatively small degree of opening. Then, at a time point t1 at which the accelerator opening degree becomes 0, too, the TBV opening degree may be controlled to the degree of opening in the fully opened state, and the WGV opening degree may be controlled to the relatively small degree of opening. Thus, when the control to fully close the TBV 53 is started in a state where the WGV opening degree has been controlled to a relatively small degree of opening, there may occur a situation where the back pressure of the internal combustion engine 1 goes up to a large extent (hereinafter, such a situation being sometimes referred to as a "choked state"). Here, when a threshold value with which it is determined whether the choked state can occur is set as a WGV opening degree threshold value WVth, the WGV opening degree is smaller than the WGV opening degree the threshold value WVth, at the time point t1. In this case, when the control to fully close the TBV 53 is started, a determination is made that the choked state can occur.

Accordingly, in the control shown in FIG. 10, first, at the time point t1 at which the request flag is set to 1 and the catalyst temperature becomes equal to or higher than the catalyst deterioration temperature Tcde, the control to fully open the WGV 54 is started before the start of the control to fully close the TBV 53. Then, at a time point t12 at which the WGV opening degree becomes equal to or more than the WGV opening degree threshold value WVth, the control to fully close the TBV 53 is started.

Here, in the control shown in FIG. 10, the WGV opening degree is controlled so as to become the degree of opening in the fully opened state, during the execution of fuel, cut in the catalyst's high temperature state. If the WGV opening degree is controlled so as to become smaller than the degree of opening in the fully opened state, during the execution of fuel cut in the catalyst's high temperature state, the exhaust gas (air) may flow into a relatively wide range of the upstream side end face 51a, as mentioned above.

In Contrast to this, when the WGV opening degree is controlled to the degree of opening in its fully opened state during the execution of fuel cut in the catalyst's high temperature state, as shown in FIG. 10, a situation in which the exhaust gas (air) is diffused by the WGV 54 is suppressed as much as possible. With this, it is possible to suppress the exhaust gas (air) from flowing into a relatively wide range of the upstream side end face 51a. Here, note that in the control shown in FIG. 10, after the time point t3 at which the catalyst temperature becomes lower than the catalyst deterioration temperature Tcde whereby the deterioration, suppression TBV control and the deterioration suppression throttle control are terminated, the WGV opening degree is controlled to a degree of opening WVpr. This degree of opening WVpr is a predetermined reference WGV opening degree which is achieved by the normal control accompanying the fuel cut processing. In the control shown in FIG. 10, the predetermined reference WGV opening degree WVpr is set to a degree of opening smaller than the WGV opening degree in the fully opened state. This is because a turbine 61 is made to run up during the execution of the fuel cut processing. However, in this second embodiment, there is no intension to limit to this In addition, FIG. 11 is a flow chart showing a control flow of the above-mentioned control shown in FIG. 10. In this second embodiment, this flow or routine is carried out at a predetermined operation interval in a repeated manner by the ECU 10 during the operation of the internal combustion engine 1.

In the flow shown in FIG. 11, if an affirmative determination is made in step S104, subsequently in step S205, the WGV opening degree (WV) is controlled so as to become the degree of opening in the fully opened state. Here, note that in the processing of step S205, the ECU 10 inputs a control signal to the WGV 54 so that the WGV opening degree (WV) becomes the degree of opening in the fully opened state, and thereafter, shifts to the following processing of step S106, without waiting until the WGV 54 is actually controlled to the fully opened state.

Then, in step S206, it is determined whether the WGV opening degree (WV) at this time is equal to or larger than the WGV opening degree threshold value WVth. Here, as mentioned above, the WGV opening degree threshold value WVth is the threshold value with which it is determined whether the choked state can occur, and it has been stored in the ROM of the ECU 10 in advance. Then, if an affirmative determination is made in step S206 (this corresponding to a period of time after the time point t12 and before the time point t3 in the above-mentioned FIG. 10), the routine of the ECU 10 goes to the processing of step S105. On the other hand, if a negative determination is made in step S206 (this corresponding to a period of time after the time point t1 and before the time point t12 in the above-mentioned FIG. 10), this flow or routine is ended. In this case, the request flag Nfrqt is 1, but the fuel cut processing is not yet started. This is because if the TBV opening degree is controlled so as to become the degree of opening in the fully closed state, in a state where the WGV opening degree (WV) is smaller than tee WGV opening degree threshold value WVth, the choked state can occur.

Moreover, in the flow or routine shown in FIG. 11, if a negative determination is made in the processing of step S104, the ECU 10 carries out the processing of step S208. In the processing of step S208, the ECU 10 controls the WGV 54 so that the WGV opening degree (WV) becomes the predetermined reference WGV opening degree WVpr, in addition to carrying out the above-mentioned processing of step S108 in FIG. 7. Then, after the processing of step S208, the execution of this flow or routine is ended.

By carrying out the control flow as mentioned above, too, the ECU 10 makes it possible to suppress the deterioration of the three-way catalyst 51 as much as possible.

Then, in this second embodiment, a controller according to the present disclosure is achieved by the ECU 10 carrying out the processing of steps S105, S107 and S205 of the above-mentioned flow shown in FIG. 11.

Modification of the Second Embodiment

Next, reference will be made to a modification of the above-mentioned second embodiment of the present disclosure based on FIG. 12. Here, note that in this modification, the detailed explanation of substantially the same construction and substantially the same control processing as in the above-mentioned first and second embodiments will be omitted.

In the above-mentioned second embodiment, the WGV opening degree is controlled so as to become the degree of opening in the fully opened state, during the execution of fuel cut in the catalyst's high temperature state. In contrast to this, in this modification, during the execution of fuel cut in the catalyst's high temperature state, the WGV opening degree is controlled so as to become an opening degree D1 shown in FIG. 12 to be described below. FIG. 12 is a view schematically showing a mole in which the exhaust, gas (air) flows into a three-way catalyst 51 at the time when deterioration suppression TBV control and deterioration suppression throttle control are carried out, and when the WGV opening degree is controlled to the opening degree D1. Here, (b) in FIG. 12 is a schematic diagram showing an upstream side end face 51a of the three-way way catalyst 51, and is a view for explaining the inflow range of the exhaust gas (air) in the upstream side end face 51a. Then, in the construction shown in FIG. 12, a partition plate 5d is arranged in a bypass passage 52 and an exhaust passage 5 between a WGV 54 and the three-way catalyst 51. The partition plate 5d is constructed in such a manner that when the WGV opening degree becomes the opening degree D1, the valve body of the WGV 54 abuts against the partition plate 5d, so that the flow of the exhaust gas (air) can be defined by the abutment state thereof. In addition, the partition plate 5d extends to right above the upstream side end face 51a of the three-way catalyst 51.

In such a construction, when the WGV opening degree is controlled to the opening degree D1 during the execution of fuel cut in the catalyst's high temperature state, the diffusion of the exhaust gas (air) is suppressed. At this time, the inflow range of the exhaust gas (air) in the upstream, side end face 51a is represented by a hatched region enclosed with a broken line C6 in (b) of FIG. 12. In addition, the above-mentioned broken line C3 shown in (b) of FIG. 5A is also shown in (b) of FIG. 12. Then, as shown in (b) of FIG. 12, the exhaust gas (air) at this time becomes easy to flow into a narrower range of the upstream side end face 51a.

Here, in this modification, in cases where the above-mentioned control flow shown in FIG. 11 is carried out, in the processing of step S205, the ECU 10 controls the WGV 54 so that the WGV opening degree (WV) becomes the opening degree D1.

According to this modification, the exhaust gas (air) will flow through the narrower range of the exhaust gas flow passage in the three-way catalyst 51. Accordingly, the three-way catalyst 51 is suppressed from being deteriorated in a relatively wide range thereof in a suitable manner during the execution of fuel cut in the catalyst's high temperature state. In other words, the deterioration of the three-way catalyst 51 is suppressed as much as possible.

Third Embodiment

Next, reference will be made to a third embodiment of the present disclosure based on FIG. 13, FIG. 14A and FIG. 14B. Here, note that in this third embodiment, the detailed explanation of substantially the same construction and substantially the same control processing as in the above-mentioned first and second embodiments will be omitted.

In this third embodiment, a WGV 54 is arranged in an outlet 52a of a bypass passage 52. FIG. 13 is a diagram showing the general configuration of the WGV 54 according to this third embodiment. In FIG. 13, a solid line represents the WGV 54 in its valve closed state, and an alternate long and short dash line represents the WGV 54 in its valve opened state. The WGV 54 has a structure in which a valve body portion 54a thereof is supported at its one side by a drive shaft 54b. With such a structure, when the drive shaft 54b is caused to rotate by an actuator (not shown), the valve body portion 54a is swung about the drive shaft 54b, whereby the WGV opening degree changes. Then, it is constructed such that when the WGV opening degree changes, the direction of the flow of the bypass exhaust gas changes. In other words, the construction is such that when the WGV 54 is in its valve opened state, the flow of the bypass exhaust gas is guided by a closure surface 54c (a surface which closes the outlet 52a of the bypass passage 52 at the time of the closure of the WGV 54) in the value body portion 54a of the WGV 54. Then, when such a WGV 54 is arranged in the outlet 52a of the bypass passage 52, the bypass exhaust gas guided by the closure surface 54c of the valve body portion 54a flows into an upstream side end face 51a of a three-way catalyst 51, before diffusing. Thus, as the direction of the flow of the bypass exhaust gas is changed by the changing of the WGV opening degree, the inflow range of the bypass exhaust gas on the upstream side end face 51a will change accordingly.

Then, in this third embodiment, when the three-way catalyst 51 has not been warmed up, an ECU 10 controls the TBV opening degree and the WGV opening degree to predetermined degrees of opening, respectively. Specifically, the ECU 10 controls the TBV opening degree to the degree of opening in its fully closed state, at the time of warming op the three-way catalyst 51. With this, the energy of the exhaust gas is suppressed from being decreased resulting from heat dissipation to a turbine 51 in its cold state, thereby making it possible to complete the warming up of the three-way catalyst 51 at a relatively early stage. In addition, the ECU 10 also controls the WGV opening degree to a first predetermined opening degree, at the time of warming up the three-way catalyst 51. Here, note that the ECU 10 functions as a controller according to the present disclosure by controlling the WGV opening degree to the first predetermined opening degree at the time of warming up the three-way catalyst 51.

Further, in this third embodiment, during the execution of fuel cut in the catalyst's high temperature state, the ECU 10 controls the WGV opening degree in such a manner that the WGV opening degree becomes a second predetermined opening degree which is different from the first predetermined opening degree. In that case, a range in which the three-way catalyst 51 becomes easy to deteriorate during the execution of fuel cut in the catalyst's high temperature state is different from a flow passage range (hereinafter, sometimes referred to as a "warming-up flow passage range") in the three-way catalyst 51 through which the exhaust gas mainly flows at the time of warming up the three-way catalyst 51. In other words, the deterioration of the three-way catalyst 51 in the warming-up flow passage range is suppressed as much as possible. Here, note that a controller according to the disclosure is achieved by the ECU 10 controlling opening degree in such a manner that the WGV opening degree becomes the second predetermined opening degree different from the first predetermined opening degree during the execution of fuel cut in the catalyst's high temperature state.

In addition, the ECU 10 may carry out the control of the WGV opening degree by setting the first predetermined opening degree and the second predetermined opening degree, as shown in FIG. 14A and FIG. 14B to be explained below. FIG. 14A is a view schematically showing a mode in which the exhaust gas flows into the three-way catalyst 51 at the time when the three-way catalyst 51 is warmed up. Here, (b) in FIG. 14 is a schematic diagram showing the upstream side end face 51a of the three-way catalyst 51, and is a view for explaining the inflow range of the exhaust gas in the upstream side end face 51a. Here, note that in FIG. 14A, the TBV opening degree is controlled to the degree of opening in its fully closed state, and in FIG. 5B, the WGV opening degree is controlled to the degree of opening in its fully opened state. In other words, in the control shown in FIG. 14A, the WGV opening degree in the fully opened state corresponds to the first predetermined opening degree. Also, FIG. 14B is a view schematically showing a mode in which the exhaust gas (air) flows into the three-way catalyst 51 at the time when deterioration suppression TBV control and deterioration suppression throttle control are carried out, and when the WGV opening degree is controlled to an opening degree D2 (a second predetermined opening degree). Here, (b) in FIG. 14B is a schematic diagram showing the upstream side end face 51a of the three-way catalyst 51, and is a view for explaining the inflow range of the exhaust gas (air) in the upstream side end face 51a.

Then, when the WGV opening degree is controlled to the degree of opening in its fully opened state (the first predetermined opening degree), the bypass exhaust gas flows into a region which is on the upstream side end face 51a and which includes the central portion of the upstream side end face 51a (hereinafter, sometimes referred to as a "first predetermined region"), as represented by a hatched region enclosed with a broken line C7 in (b) of FIG. 14A. On the other hand, when the WGV opening degree is controlled to the opening degree D2 (the second predetermined opening degree), the bypass exhaust gas flows into a region which is on the upstream side end face 51a and which is at the outer side of the first predetermined region (hereinafter, sometimes referred to as a "second predetermined region"), as represented by a hatched region enclosed with a brokers line GO in (b) of FIG. 14B. Accordingly, when the three-way catalyst 51 is warmed up, the exhaust gas will flow into the first predetermined region, whereas during the execution of fuel cut in the catalyst's high temperature state, the exhaust gas (air) flows into the second predetermined region.

Thus, when the exhaust gas flows into the first predetermined region, it becomes hard for the exhaust gas to collide against a wall surface of the exhaust passage 5, as shown in FIG. 14A. In that case, heat transfer between the exhaust gas and the wall surface of the exhaust passage 5 is suppressed. In other words, a situation where at the time of warming up the three-way catalyst 51, heat moves from the exhaust gas to the wall surface or the exhaust passage 5 is suppressed. With this, at the time of warming up the three-way catalyst 51, the temperature of the exhaust gas flowing into the three-way catalyst 51 can be made as high as possible. As a result, it becomes possible to warm op the three-way catalyst 51 early.

Moreover, during the execution of fuel cut in the catalyst's high temperature state, the exhaust gas (air) flows into the second predetermined region (the hatched region enclosed with the broken line C8) at the outer side of the first predetermined region (the hatched region enclosed with the broken line C7), as shown in FIG. 14B, so that the deterioration of the three-way catalyst 51 in the warming-up flow passage range is suppressed as much as possible. As a result, a situation where exhaust emissions deteriorate at the time of warming up the three-way catalyst 51 is suppressed.

Here, in this third embodiment, in cases where the above-mentioned control flow shown in FIG. 11 is carried out, in the processing of step S205, the ECU 10 controls the WGV 54 so that the WGV opening degree (WV) becomes the opening degree D2 (the second predetermined opening degree).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification system for an internal combustion engine comprising:
 a throttle valve that is arranged in an intake passage of said internal combustion engine;
 a turbocharger with a turbine that is arranged in an exhaust passage of said internal combustion engine;
 an exhaust gas purification catalyst that is arranged in said exhaust passage at the downstream side of said turbine, said exhaust gas purification catalyst having an ability to store oxygen in an exhaust gas;
 a bypass passage that branches from said exhaust passage at a location upstream of said turbine, and merges to said exhaust passage at a location upstream of said exhaust gas purification catalyst, while bypassing said turbine, wherein said bypass passage is constructed to have an outlet of which diameter is smaller than a diameter of an upstream side end face of said exhaust gas purification catalyst, and is also constructed so as to direct a direction of flow of a bypass exhaust gas, which is the exhaust gas flowing out from said bypass passage into said exhaust passage, toward the upstream side end face of said exhaust gas purification catalyst;
 a turbo bypass valve that is arranged in said exhaust passage between a branch portion of said bypass passage and a merge portion of said bypass passage, said turbo bypass valve being able to adjust a flow rate of the exhaust gas passing through said turbine; and
 a controller comprising at least one processor configured to:
 carry out fuel cut processing which stops the supply of fuel into a cylinder of said internal combustion engine during operation of said internal combustion engine; and
 carry out deterioration suppression control which controls a degree of opening of said turbo bypass valve and a degree of opening of said throttle valve in such a manner that when a temperature of said exhaust gas purification catalyst is equal to or higher than a predetermined temperature in the course of the execution of said fuel cut processing, the degree of opening of said turbo bypass valve becomes smaller, and the degree of opening of said throttle valve becomes larger, than when the temperature of said exhaust gas purification catalyst is lower than said predetermined temperature in the course of the execution of said fuel cut processing.

2. The exhaust gas purification system for an internal combustion engine according to claim 1, further comprising:
 a wastegate valve that is arranged in said bypass passage at the upstream side of a predetermined downstream side portion thereof including its outlet, with an exhaust gas channel cross sectional area in said bypass passage being able to be changed;
 wherein said controller is further configured to control a degree of opening of said wastegate valve in such a manner that the degree of opening of said wastegate valve becomes a degree of opening in its fully opened state, when the temperature of said exhaust gas purification catalyst is equal to or higher than said predetermined temperature in the course of the execution of said fuel cut processing.

3. The exhaust gas purification system for an internal combustion engine according to claim 1, further comprising:

a wastegate valve that is arranged in a predetermined downstream side portion of said bypass passage including its outlet, with an exhaust gas channel cross sectional area in said bypass passage being able to be changed, said wastegate valve having a structure in which a degree of opening of said wastegate valve changes as a valve body portion thereof swings with one side thereof supported, so that the direction of the flow of said bypass exhaust gas changes when the degree of opening of said wastegate valve changes, said wastegate valve being constructed so as to direct the direction of the flow of said bypass exhaust gas to the upstream side end face of said exhaust gas purification catalyst in a predetermined opening degree range;

wherein said controller is further configured to control the degree of opening of said wastegate valve to a first predetermined opening degree at the time of warming up said exhaust gas purification catalyst, and the controller controls the degree of opening of said wastegate valve in such a manner that the degree of opening of said wastegate valve becomes a second predetermined opening degree which is different from said first predetermined opening degree, when the temperature of said exhaust gas purification catalyst is equal to or higher than said predetermined temperature in the course of the execution of said fuel cut processing.

4. The exhaust gas purification system for an internal combustion engine according to claim 3, wherein said first predetermined opening degree is set in such a manner that when the degree of opening of said wastegate valve is controlled to said first predetermined opening degree by said controller, said bypass exhaust gas flows into a first predetermined region which is on the upstream side end face of said exhaust gas purification catalyst, and which includes a central portion on the upstream side end face of said exhaust gas purification catalyst; and said second predetermined opening degree is set in such a manner that when the degree of opening of said wastegate valve is controlled to said second predetermined opening degree by said controller, said bypass exhaust gas flows into a second predetermined region which is on the upstream side end face of said exhaust gas purification catalyst, and which is at the outer side of said first predetermined region.

5. The exhaust gas purification system for an internal combustion engine according to claim 1, wherein when the temperature of said exhaust gas purification catalyst changes from a temperature equal to or higher than said predetermined temperature to a temperature lower than said predetermined temperature, in the course of the execution of said fuel cut processing, said controller terminates said deterioration suppression control, and controls the degree of opening of said turbo bypass valve and the degree of opening of said throttle valve in such a manner that the degree of opening of said turbo bypass valve becomes a predetermined reference turbo bypass valve opening degree, and the degree of opening of said throttle valve becomes a predetermined reference throttle opening degree.

6. The exhaust gas purification system for an internal combustion engine according to claim 2, wherein when the temperature of said exhaust gas purification catalyst changes from a temperature equal to or higher than said predetermined temperature to a temperature lower than said predetermined temperature, in the course of the execution of said fuel cut processing, said controller terminates said deterioration suppression control, and controls the degree of opening of said turbo bypass valve and the degree of opening of said throttle valve in such a manner that the degree of opening of said turbo bypass valve becomes a predetermined reference turbo bypass valve opening degree, and the degree of opening of said throttle valve becomes a predetermined reference throttle opening degree.

7. The exhaust gas purification system for an internal combustion engine according to claim 3, wherein when the temperature of said exhaust gas purification catalyst changes from a temperature equal to or higher than said predetermined temperature to a temperature lower than said predetermined temperature, in the course of the execution of said fuel cut processing, said controller terminates said deterioration suppression control, and controls the degree of opening of said turbo bypass valve and the degree of opening of said throttle valve in such a manner that the degree of opening of said turbo bypass valve becomes a predetermined reference turbo bypass valve opening degree, and the degree of opening of said throttle valve becomes a predetermined reference throttle opening degree.

8. The exhaust gas purification system for an internal combustion engine according to claim 4, wherein when the temperature of said exhaust gas purification catalyst changes from a temperature equal to or higher than said predetermined temperature to a temperature lower than said predetermined temperature, in the course of the execution of said fuel cut processing, said controller terminates said deterioration suppression control, and controls the degree of opening of said turbo bypass valve and the degree of opening of said throttle valve in such a manner that the degree of opening of said turbo bypass valve becomes a predetermined reference turbo bypass valve opening degree, and the degree of opening of said throttle valve becomes a predetermined reference throttle opening degree.

* * * * *

UNITED STATES PATENT AND TRADEMARK OFFICE
CERTIFICATE OF CORRECTION

PATENT NO. : 10,830,167 B2
APPLICATION NO. : 15/982327
DATED : November 10, 2020
INVENTOR(S) : Koichi Kitaura et al.

Page 1 of 4

It is certified that error appears in the above-identified patent and that said Letters Patent is hereby corrected as shown below:

On the Title Page

Item (71), Applicant, city, delete "Toyota" and insert --Toyota-shi Aichi-ken--, therefor.

Item (72), inventor 1, city, delete "Odawara" and insert --Odawara-shi Kanagawa-ken--, therefor.

Item (72), inventor 2, city, delete "Susono" and insert --Susono-shi Shizuoka-ken--, therefor.

Item (72), inventor 3, city, delete "Mishima" and insert --Mishima-shi Shizuoka-ken--, therefor.

Item (72), inventor 4, city, delete "Gotemba" and insert --Gotemba-shi Shizuoka-ken--, therefor.

Item (73), Assignee, city, delete "Toyota" and insert --Toyota-shi Aichi-ken--, therefor.

In the Specification

In Column 1, Line(s) 23, after "formed", delete ",".

In Column 1, Line(s) 64, delete "It" and insert --In--, therefor.

In Column 1, Line(s) 65, delete "ups crease" and insert --upstream--, therefor.

In Column 2, Line(s) 9, after "fuel", delete "out" and insert --cut--, therefor.

In Column 2, Line(s) 53, delete "fox" and insert --for--, therefor.

In Column 3, Line(s) 21, after "smaller", delete ";" and insert --,--, therefor.

In Column 3, Line(s) 26, after "defined", delete ",".

Signed and Sealed this
Ninth Day of March, 2021

Drew Hirshfeld
*Performing the Functions and Duties of the
Under Secretary of Commerce for Intellectual Property and
Director of the United States Patent and Trademark Office*

In Column 3, Line(s) 62, after "thereof", delete "," and insert --.--, therefor.

In Column 3, Line(s) 63, delete "accordingly" and insert --Accordingly--, therefor.

In Column 4, Line(s) 14, delete "ranch" and insert --much--, therefor.

In Column 4, Line(s) 33, delete "control" and insert --controller--, therefor.

In Column 5, Line(s) 18, after "passage", delete "." and insert --,--, therefor.

In Column 6, Line(s) 56, delete "pas" and insert --gas--, therefor.

In Column 7, Line(s) 41, delete "cuter" and insert --outer--, therefor.

In Column 7, Line(s) 56, after "from", delete ",".

In Column 8, Line(s) 4, delete "temper attire" and insert --temperature--, therefor.

In Column 8, Line(s) 5, after "purification", delete ",".

In Column 8, Line(s) 10, after "control", delete ",".

In Column 8, Line(s) 35, delete "cat" and insert --cut--, therefor.

In Column 9, Line(s) 7, delete "flews" and insert --flows--, therefor.

In Column 9, Line(s) 29, after "configuration", delete ",".

In Column 9, Line(s) 65, delete "valves 1" and insert --valves 3--, therefor.

In Column 10, Line(s) 33, delete "downs cream aide" and insert --downstream side--, therefor.

In Column 10, Line(s) 37, delete "calve" and insert --valve--, therefor.

In Column 11, Line(s) 31, delete "art" and insert --an--, therefor.

In Column 12, Line(s) 3, delete "combustion, is a" and insert --combustion. As a--, therefor.

In Column 12, Line(s) 45, after "fuel", delete ",".

In Column 13, Line(s) 3, delete "ha" and insert --5a--, therefor.

In Column 13, Line(s) 5, delete "she" and insert --the--, therefor.

In Column 14, Line(s) 6, delete "ah" and insert --at--, therefor.

CERTIFICATE OF CORRECTION (continued)
U.S. Pat. No. 10,830,167 B2

In Column 14, Line(s) 14, delete "one" and insert --the--, therefor.

In Column 14, Line(s) 52, after "based on", delete "FIG." and insert --FIG. 4,--, therefor.

In Column 15, Line(s) 56, delete "daring" and insert --during--, therefor.

In Column 15, Line(s) 58, after "will", delete ",".

In Column 15, Line(s) 66, delete "aide" and insert --side--, therefor.

In Column 16, Line(s) 15, after "FIG. 5A", insert --,--.

In Column 16, Line(s) 17, delete "FIG." and insert --FIG. 4.--, therefor.

In Column 16, Line(s) 31, delete "fair)" and insert --(air)--, therefor.

In Column 16, Line(s) 45, delete "51a. In" and insert --51a in--, therefor.

In Column 17, Line(s) 30, delete "one" and insert --the--, therefor.

In Column 17, Line(s) 31, delete "she" and insert --the--, therefor.

In Column 18, Line(s) 17, delete "cat" and insert --cut--, therefor.

In Column 18, Line(s) 23, after "(air)", insert --may--.

In Column 18, Line(s) 53, after "control", delete ",".

In Column 18, Line(s) 58, delete "op" and insert --up--, therefor.

In Column 18, Line(s) 60, delete "resetting" and insert --resulting--, therefor.

In Column 19, Line(s) 3, after "control", delete ",".

In Column 19, Line(s) 20, after "request", delete ",".

In Column 19, Line(s) 23, delete "fox" and insert --for--, therefor.

In Column 19, Line(s) 32, delete "out" and insert --cut--, therefor.

In Column 19, Line(s) 33, after "request", delete ",".

In Column 19, Line(s) 42, delete "above mentioned" and insert --above-mentioned--, therefor.

In Column 19, Line(s) 64, delete "13" and insert --t3--, therefor.

CERTIFICATE OF CORRECTION (continued)
U.S. Pat. No. 10,830,167 B2

In Column 20, Line(s) 35, delete "31" and insert --51--, therefor.

In Column 21, Line(s) 30, delete "one" and insert --the--, therefor.

In Column 21, Line(s) 31, delete "sauce" and insert --same--, therefor.

In Column 21, Line(s) 36, delete "FIG. 3" and insert --FIG. 8--, therefor.

In Column 21, Line(s) 59, delete "wade" and insert --wide--, therefor.

In Column 22, Line(s) 8, delete "she" and insert --the--, therefor.

In Column 22, Line(s) 19, delete "WGV 53" and insert --WGV 54--, therefor.

In Column 23, Line(s) 35, after "fuel", delete ",".

In Column 23, Line(s) 42, delete "Contrast" and insert --contrast--, therefor.

In Column 24, Line(s) 12, delete "S106" and insert --S206--, therefor.

In Column 24, Line(s) 33, delete "tee" and insert --the--, therefor.

In Column 25, Line(s) 2, delete "mole" and insert --mode--, therefor.

In Column 25, Line(s) 2, after "exhaust", delete ",".

In Column 25, Line(s) 8, after "three-way", delete "way".

In Column 25, Line(s) 25, after "upstream", delete ",".

In Column 26, Line(s) 21, delete "op" and insert --up--, therefor.

In Column 26, Line(s) 23, delete "turbine 51" and insert --turbine 61--, therefor.

In Column 26, Line(s) 48, before "disclosure", insert --present--.

In Column 26, Line(s) 49, after "controlling", insert --the WGV--.

In Column 27, Line(s) 4, delete "FIG. 148" and insert --FIG. 14B--, therefor.

In Column 27, Line(s) 30, delete "GO" and insert --C8--, therefor.

In Column 27, Line(s) 42, delete "or" and insert --of--, therefor.

In Column 27, Line(s) 46, delete "op" and insert --up--, therefor.